United States Patent
Miller et al.

(10) Patent No.: US 6,226,418 B1
(45) Date of Patent: May 1, 2001

(54) RAPID CONVOLUTION BASED LARGE DEFORMATION IMAGE MATCHING VIA LANDMARK AND VOLUME IMAGERY

(75) Inventors: Michael I. Miller, Baltimore, MD (US); Sarang C. Joshi, St. Louis, MO (US); Gary E. Christensen, Iowa City, IA (US)

(73) Assignee: Washington University, St. Louis, MI (US)

(*) Notice: Subject to any disclaimer, the term of this patent is extended or adjusted under 35 U.S.C. 154(b) by 0 days.

(21) Appl. No.: 09/186,359

(22) Filed: Nov. 5, 1998

Related U.S. Application Data

(63) Continuation-in-part of application No. 08/678,628, filed as application No. PCT/US97/11563 on Jul. 8, 1997, now Pat. No. 6,009,212.
(60) Provisional application No. 60/064,615, filed on Nov. 7, 1997.

(51) Int. Cl.$^7$ .................. G06K 9/36; G06K 9/00
(52) U.S. Cl. ............ 382/294; 382/131; 382/151; 382/291
(58) Field of Search ................. 382/131, 151, 382/217, 218, 276, 280, 291, 294; 345/425; 378/4; 600/424, 426

(56) References Cited

U.S. PATENT DOCUMENTS

| | | | |
|---|---|---|---|
| 4,262,306 | 4/1981 | Renner | 348/77 |
| 4,583,538 | 4/1986 | Onic et al. | 606/130 |
| 4,590,607 | 5/1986 | Kauth | 382/41 |
| 4,608,977 | 9/1986 | Brown | 606/130 |
| 4,644,582 | 2/1987 | Morishita et al. | 382/6 |
| 4,662,222 | 5/1987 | Johnson et al. | 73/602 |

(List continued on next page.)

FOREIGN PATENT DOCUMENTS

| | | |
|---|---|---|
| 3205085A1 | 9/1982 | (DE). |
| 3 508 730 A1 | 9/1986 | (DE). |
| 0 062 941 | 10/1982 | (EP) ............... A61B/5/10 |
| 0 326 768 | 8/1989 | (EP). |
| 0 359 773 | 3/1990 | (EP). |

(List continued on next page.)

OTHER PUBLICATIONS

PCT International Search Report, PCT/US99/12698, Oct. 21, 1999.
Galvin, Jeffrey R., et al., "Image Corner, The Virtual Hospital, Providing Multimedia Decision Support Tools via the Internet", SPINE, vol. 20, No. 15, pp. 1735–1738, 1995.
"The Novel Hypermedia System for UNIX Workstations, VOXEL–MAN", Institute of Mathematics and Computer Science.
"The Electronic Clinical Brain Atlas: Three–Dimensional Navigation of the Human Brain", Thieme, Apr. 1996.
Joshi et al., "Hierarchical Brain Mapping Via A General Dirichlet Solution for Mapping Brain Manifolds", SPIE—The International Society for Optical Engineering, Jul. 1995, vol. 2753.

(List continued on next page.)

*Primary Examiner*—Phuoc Tran
*Assistant Examiner*—Daniel G. Mariam
(74) *Attorney, Agent, or Firm*—Finnegan, Henderson, Farabow, Garrett & Dunner, L.L.P.

(57) ABSTRACT

An apparatus and method for image registration of a template image with a target image with large deformation. The apparatus and method involve computing a large deformation transform based on landmark manifolds, image data or both. The apparatus and method are capable of registering images with a small number of landmark points. Registering the images is accomplished by applying the large deformation transform.

51 Claims, 12 Drawing Sheets

U.S. PATENT DOCUMENTS

| | | | |
|---|---|---|---|
| 4,673,352 | 6/1987 | Hansen | 433/69 |
| 4,701,049 | 10/1987 | Beckman | 356/3.07 |
| 4,722,056 | 1/1988 | Roberts et al. | 600/130 |
| 4,737,921 | 4/1988 | Goldwasser et al. | 345/421 |
| 4,791,934 | 12/1988 | Brunnett | 606/130 |
| 4,821,200 | 4/1989 | Oberg | 364/474.24 |
| 4,821,213 | 4/1989 | Cline et al. | 345/424 |
| 4,835,688 | 5/1989 | Kimura | 345/424 |
| 4,836,778 | 6/1989 | Baumrind et al. | 433/69 |
| 4,879,668 | 11/1989 | Cline et al. | 345/424 |
| 4,896,673 | 1/1990 | Rose et al. | 600/439 |
| 4,945,914 | 8/1990 | Allen | 128/653 R |
| 4,958,283 | 9/1990 | Tawara et al. | 364/413.13 |
| 4,987,412 | 1/1991 | Vaitekunas et al. | 340/721 |
| 4,991,579 | 2/1991 | Allen | 128/653 R |
| 5,005,126 | 4/1991 | Haskin | 364/413.13 |
| 5,016,639 | 5/1991 | Allen | 128/653 R |
| 5,027,422 | 6/1991 | Peregrim et al. | 382/48 |
| 5,039,867 | 8/1991 | Nishihara et al. | 250/492.3 |
| 5,048,103 | 9/1991 | Leclerc et al. | 382/44 |
| 5,050,608 | 9/1991 | Watanabe et al. | 600/429 |
| 5,078,140 | 1/1992 | Kwoh | 600/417 |
| 5,079,699 | 1/1992 | Tuy et al. | 345/424 |
| 5,086,401 | 2/1992 | Glassman et al. | 700/259 |
| 5,094,241 | 3/1992 | Allen | 128/653.1 |
| 5,099,846 | 3/1992 | Hardy | 600/407 |
| 5,119,817 | 6/1992 | Allen | 128/653.1 |
| 5,142,930 | 9/1992 | Allen et al. | 74/469 |
| 5,166,875 | 11/1992 | Machida | 600/410 |
| 5,178,164 | 1/1993 | Allen | 128/898 |
| 5,186,174 | 2/1993 | Schlondorff et al. | 600/426 |
| 5,197,476 | 3/1993 | Nowacki et al. | 128/660.03 |
| 5,198,877 | 3/1993 | Schulz | 356/375 |
| 5,207,223 | 5/1993 | Adler | 600/427 |
| 5,222,499 | 6/1993 | Allen et al. | 600/426 |
| 5,229,935 | 7/1993 | Yamagishi et al. | 600/425 |
| 5,230,338 | 7/1993 | Allen et al. | 600/429 |
| 5,241,472 | 8/1993 | Gur et al. | 364/413.22 |
| 5,249,581 | 10/1993 | Horbal et al. | 600/407 |
| 5,251,127 | 10/1993 | Raab | 606/130 |
| 5,257,998 | 11/1993 | Ota et al. | 606/130 |
| 5,261,404 | 11/1993 | Mick et al. | 600/426 |
| 5,272,625 | 12/1993 | Nishihara et al. | 364/413.13 |
| 5,274,551 | 12/1993 | Corby, Jr. | 364/413.13 |
| 5,284,142 | 2/1994 | Gobel et al. | 600/547 |
| 5,291,401 | 3/1994 | Robinson | 364/413.13 |
| 5,291,889 | 3/1994 | Kenet et al. | 600/425 |
| 5,295,200 | 3/1994 | Boyer | 382/280 |
| 5,295,483 | 3/1994 | Nowacki et al. | 600/439 |
| 5,299,288 | 3/1994 | Glassman et al. | 700/245 |
| 5,305,203 | 4/1994 | Raab | 606/1 |
| 5,309,356 | 5/1994 | Nishide et al. | 382/131 |
| 5,309,913 | 5/1994 | Kormos et al. | 600/429 |
| 5,331,553 | 7/1994 | Muehllehner et al. | 250/363.02 |
| 5,351,310 | 9/1994 | Califano et al. | 382/22 |
| 5,351,697 | 10/1994 | Cheney et al. | 600/547 |
| 5,353,220 | 10/1994 | Ito et al. | 600/437 |
| 5,359,417 | 10/1994 | Muller et al. | 356/375 |
| 5,368,030 | 11/1994 | Zinreich et al. | 600/414 |
| 5,371,778 | 12/1994 | Yanof et al. | 378/4 |
| 5,383,119 | 1/1995 | Tam | 378/8 |
| 5,383,454 | 1/1995 | Bucholz | 600/429 |
| 5,389,101 | 2/1995 | Heilbrum et al. | 606/130 |
| 5,390,110 | 2/1995 | Cheney et al. | 128/653.1 |
| 5,398,684 | 3/1995 | Hardy | 600/391 |
| 5,399,146 | 3/1995 | Nowacki et al. | 601/4 |
| 5,402,337 | 3/1995 | Nishide | 345/426 |
| 5,402,801 | 4/1995 | Taylor | 128/898 |
| 5,412,763 | 5/1995 | Knoplioch et al. | 345/424 |
| 5,442,733 | 8/1995 | Kaufman et al. | 345/424 |
| 5,447,154 | 9/1995 | Cinquin et al. | 600/429 |
| 5,452,416 | 9/1995 | Hilton et al. | 345/346 |
| 5,463,721 | 10/1995 | Tam | 345/427 |
| 5,465,308 | 11/1995 | Hutchenson et al. | 382/159 |
| 5,465,378 | 11/1995 | Duensing et al. | 395/800 |
| 5,483,606 | 1/1996 | Denber | 382/294 |
| 5,483,961 | 1/1996 | Kelly et al. | 128/653.1 |
| 5,490,221 | 2/1996 | Ransford et al. | 382/130 |
| 5,494,034 | 2/1996 | Schlondorff et al. | 600/425 |
| 5,515,160 | 5/1996 | Schulz et al. | 356/241.1 |
| 5,517,990 | 5/1996 | Kalfas et al. | 600/414 |
| 5,526,576 | 6/1996 | Fuchs et al. | 33/503 |
| 5,531,227 | 7/1996 | Schneider | 600/425 |
| 5,531,520 | 7/1996 | Grimson et al. | 382/131 |
| 5,568,384 | 10/1996 | Robb et al. | 364/419 |
| 5,568,809 | 10/1996 | Ben-haim | 128/656 |
| 5,572,999 | 11/1996 | Funda et al. | 128/653.1 |
| 5,581,638 | 12/1996 | Givens et al. | 382/294 |
| 5,588,430 | 12/1996 | Bova et al. | 128/653.1 |
| 5,603,318 | 2/1997 | Heilbrum et al. | 600/426 |
| 5,615,112 | 3/1997 | Liu Sheng et al. | 395/615 |
| 5,617,857 | 4/1997 | Chader et al. | 600/424 |
| 5,622,170 | 4/1997 | Schulz | 600/424 |
| 5,630,431 | 5/1997 | Taylor | 128/897 |
| 5,633,951 | 5/1997 | Moshfeghi | 382/154 |
| 5,638,819 | 6/1997 | Manwaring et al. | 600/424 |
| 5,647,361 | 7/1997 | Damadian | 600/411 |
| 5,662,111 | 9/1997 | Cosman | 600/417 |
| 5,676,673 | 10/1997 | Ferre et al. | 606/130 |
| 5,682,526 | 10/1997 | Smokoff et al. | 395/615 |
| 5,682,886 | 11/1997 | Delp et al. | 600/407 |
| 5,695,500 | 12/1997 | Taylor et al. | 606/130 |
| 5,695,501 | 12/1997 | Carol et al. | 606/130 |
| 5,711,299 | 1/1998 | Manwaring et al. | 128/653.1 |
| 5,734,915 | 3/1998 | Roewer | 395/773 |
| 5,740,274 | 4/1998 | Ono et al. | 382/196 |
| 5,740,428 | 4/1998 | Mortimore et al. | 395/615 |
| 5,747,362 | 5/1998 | Funda et al. | 128/653.1 |
| 5,747,767 | 5/1998 | Raab | 382/128 |
| 5,755,725 | 5/1998 | Druais | 606/130 |
| 5,772,594 | 6/1998 | Barrick | 600/407 |
| 5,795,294 | 8/1998 | Luber et al. | 600/407 |
| 5,799,055 | 8/1998 | Peshkin et al. | 378/42 |
| 5,800,535 | 9/1998 | Howard, III | 623/10 |
| 5,823,958 | 10/1998 | Truppe | 600/426 |
| 5,833,608 | 11/1998 | Acker | 600/409 |
| 5,834,759 | 11/1998 | Glossop | 250/203.1 |
| 5,836,954 | 11/1998 | Heilbrun et al. | 606/130 |
| 5,848,967 | 12/1998 | Cosman | 600/426 |
| 5,851,183 | 12/1998 | Bucholz | 600/425 |
| 5,868,675 | 2/1999 | Henrion et al. | 600/424 |
| 5,871,445 | 2/1999 | Bucholz | 600/407 |
| 5,871,487 | 2/1999 | Warner et al. | 606/130 |
| 5,891,157 | 4/1999 | Day et al. | 606/130 |
| 5,904,691 | 5/1999 | Barnett et al. | 606/130 |
| 5,920,395 | 7/1999 | Schulz | 356/375 |
| 5,921,992 | 7/1999 | Costales et al. | 606/130 |
| 5,978,507 | * 11/1999 | Shackleton et al. | 382/195 |
| 5,999,840 | 12/1999 | Grimson et al. | 600/424 |
| B1 5,383,454 | 12/1996 | Bucholz | 600/429 |

FOREIGN PATENT DOCUMENTS

| | | |
|---|---|---|
| 0 427 358 | 5/1991 | (EP) . |
| 0 456 103 | 11/1991 | (EP) . |
| 0 469 966 | 2/1992 | (EP) . |
| 0 581 704 | 2/1994 | (EP) . |
| 0 501 993 | 5/1996 | (EP) . |
| 2 094 590 | 9/1982 | (GB) . |
| 62-000327 | 1/1987 | (JP) . |
| WO 88/09151 | 12/1988 | (WO) . |
| WO 90/05494 | 5/1990 | (WO) . |

| | | |
|---|---|---|
| WO 91/04711 | 4/1991 | (WO) . |
| WO 91/07726 | 5/1991 | (WO) . |
| WO 92/06645 | 4/1992 | (WO) . |
| WO 93/20528 | 10/1993 | (WO) . |
| WO 94/23647 | 10/1994 | (WO) . |
| WO 94/24933 | 11/1994 | (WO) . |
| WO 96/11624 | 4/1996 | (WO) . |

OTHER PUBLICATIONS

Davitokas, C.A. et al., "Image Registration Based on Boundary Mapping", Johns Hopkins University, Mar. 1995.

International Search Report, PCT/US98/23619, Apr. 12, 1999.

Evans et al., "Three–Dimensional Correlative Imaging: Applications in Human Brain Mapping," Academic Press, Inc. (1994).

Toga, Arthur W., "Visualization and Warping of Multimodality Brain Imagery," Academic Press, Inc. (1994).

Bookstein, Fred L., "Landmarks, Edges, Morphometrics, and the Brain Atlas Problem," Academic Press, Inc. (1994).

Christensen, et al., "3D Brain Mapping Using a Deformable Neuroanatomy," *Phys. Med. Biol.* 39, pp. 608–618 (1994).

Christensen, et al., "Volumetric Transformation of Brain Anatomy," (Mar. 1996).

Rabbitt et al., "Mapping of hyperelestic deformable templates using the finite element method," *SPIE* Paper No. 2573–23 (Jun. 1995).

Rabbitt et al., "Mapping Inter–Subject Variations in Tissue Geometry," ASME Bioengineering Conference, Beaver Creek, CO.

Lemeke et al., "Computer Assisted Radiology: Proceedings of the International Symposium on Computer and Communication Systems for Image Guided Diagnosis and Therapy," Springer (1995).

Christensen et al., "Synthesis of an Individualized Cranial Atlas with Dysmorphic Shape," (Jun. 1996).

Christensen et al., "A 3D Deformable Infant CT Atlas," *CAR 96: Computer Assisted Radiology*, Elsevier, New York, Jun. 1996 pp. 847–852.

Christensen et al., "Individualizing Neuro–anatomical Atlases Using a Massively Parallel Computer," *IEEE* (1996).

Christensen et al., "Automatic Analysis of Medical Images Using a Deformable Textbook," *CAR 95: Computer Assisted Radiology*, Springer Verlad, Berlin, Jun. 1995, pp. 146–151.

Haller et al., "A Comparison of Automated And Manual Segmentation of Hippocampus MR Images," *SPIE*, vol. 2434 (Mar. 1995).

Haller et al., "Hippocampal MR Morphometry by General Pattern Matching," *Radiology*, 1996, vol. 199, pp. 787–791.

Bookstein, Fred L., "Landmarks, Edges, Morphometrics, and the Brain Atlas Problem," Aug. 28, 1992.

Bajcsy et al., "A Computerized System for the Elastic Matching of Deformed Radiographic Images to Idealized Atlas Images," *Journal of Computer Assisted Technology*, Raven Press (Aug. 1983).

Bajcsy, Ruzena, "Three–Dimensional Analysis and Display of Medical Images, Positron Emission Tomography," Alan R. Liss, Inc., pp. 119–129 (1985).

Dann et al., "Evaluation of Elastic Matching System for Anatomic (CT, MR) and Functional (PET) Cerebral Images," *Journal of Computer Assisted Technology*, Raven Press Ltd., (Jul./Aug. 1989).

Bajcsy et al., "Evaluation of Registration of PET Images With CT Images," (Nov. 1988).

Bajcsy et al., "Multiresolution Elastic Matching," (Oct. 1987).

Evans et al., "Warping of a Computerized 3–D Atlas to Match Brain Image Volumes for Quantitative Neuroanatomical and Functional Analysis," *SPIE*, vol. 1445 Image Processing (1991) pp. 236–246.

Collins et al., "An Automated 3D Non–Linear Image Deformation Procedure for Determination of Gross Morphometric Variability in Human Brain," *SPIE*, vol. 2359 (Mar. 1994).

Undrill et al., "Integrated Presentation of 3D Data Derived from Multi–Sensor Imagery and Anatomical Atlases Using A Parallel Processing System," *SPIE*, vol. 1653 Image Capture, Formatting, and Display (1992).

Amit, Yali, "A Non–Linear Variational Problem For Image Matching," Division of Applied Mathematics, Brown University.

Amit, Yali, "Graphical Shape Templates for Deformable Model Registration," Department of Statistics, University of Chicago Block Fund, ARO DAAL03–92–6–0322.

Fritsch et al., "The Multiscale Medial Axis and Its Applications In Image Registration," Elsevier Science B.V., *Pattern Recognition Letters* 15, pp. 445–452 (1994).

Vemuri et al., "Multiresolution Stochastic Hybrid Shape Models with Fractal Priors," *ACM Transactions on Graphics*, vol. 13, No. 2, pp. 177–207 (Apr. 1994).

Davatzikos et al., "Image Registration Based on Boundary Mapping," *IEEE Trans on Image Processing*, Feb. 1996, vol. 15, No. 1, pp. 112–115.

Davatzikos et al., "An Active Contour Model for Mapping the Cortex," *IEEE TMI*, Mar. 1995, vol. 14, pp. 65–80.

Davatzikos et al., "Brain Image Registration Based on Curve Mapping," *IEEE* (1994).

Davatzikos et al., "Brain Image Registration Based on Cortical Contour Mapping," *IEEE* (1994).

Davatzikos et al., "Adaptive Active Contour Algorithms for Extracting and Mapping Thick Curves," *IEEE* (1993).

Cootes et al., "Use of Active Shape Models for Locating Structures in Medical Images," Butterworth–Heinemann Ltd., Image and Vision Computing, vol. 12, No. 6, (Jul./Aug. 1994).

Sozou et al., "Non–Linear Generalization of Point Distribution Models Using Polynomial Regression," Elsevier Science B.V., *Image and Vision Computer*, vol. 13, No. 5 (Jun. 1995).

Cootes, et al., "Combining Point Distribution Models with Shape Models Based on Finite Element Analysis," Elsevier Science B.V., *Image and Vision Computer*, vol. 13, No. 5 (Jun. 1995).

Cootes et al., "Active Shape Models—Their Training and Application," Academic Press, Inc., *Computer Vision and Image Understanding*, vol. 61, No. 1, pp. 38–59 (Jan. 1995).

Hill et al., "Medical Image Interpretation: A Generic Approach Using Deformable Templates," Taylor & Francis, Ltd., *Med. Inform.*, vol. 19, No. 1, pp. 47–59 (1994).

Woods et al., "Rapid Automated Algorithm for Aligning and Reslicing PET Images," Raven Press, Ltd., *Journal of Computer Assisted Tomography*, vol. 16, No. 4 (1992).

Woods, et al., "MRI–PET Registration with Automated Algorithm," Raven Press, Ltd., *Journal of Computer Assisted Tomography*, vol. 17, No. 4 (1993).

Fox et al., "A Stereotactic Method of Anatomical Localization for Positron Emission Tomography," Raven Press, Ltd., *Journal of Computer Assisted Tomography*, vol. 9, No. 1 (1985).

Pelizzari et al., "Accurate Three–Dimensional Registration of CT, PET, and/or MR Images of the Brain," Raven Press Ltd., *Journal of Computer Assisted Tomography*, vol. 13, No. 1, pp. 20–26 1989.

Greitz et al., "Computerized Brain Atlas: Construction, Anatomical Content, and Some Application," Raven Press, Ltd., *Journal of Computer Assisted Tomograph*, vol. 15, No. 1 (1991).

Evans et al., "Image Registration Based on Discrete Anatomic Structures".

Lerios et al., "Feature–Based Volume Metamorphosis," Computer Graphics Processings, Annual Conference Series (1995).

Toga, Arthur W., "Three Dimensional Neuroimaging," Raven Press.

Friston et al., "Plastic Transformation of PET Images," Raven Press, *Journal of Computer Assisted Tomography*, vol. 15, No. 4 (1991).

Friston, et al., "Spatial Registration and Normalization of Images," Wiley–Liss, Inc. (1995).

Melter et al., "Vision Geometry IV," SPIE Proceedings, vol. 2573 (1995).

Gramkow, Claus, "Registration of 2D and 3D Medical Images," Lyngby 1996, IMM–EKS–1996–1, pp. 1–325.

Maurer, Jr., et al., "A Review of Medical Image Registration," *Interactive Image–Guided Neurosurgery*, Chapter 3, pp. 17–44.

Gee et al., "Bayesian Approach to the Brain Image Matching Problem," *SPIE*, vol. 2434, pp. 145–156.

Collins et al., "Automatic 3D Intersubject Registration of MR Volumetric Data in Standardized Talairach Space," *Journal of Computer Assisted Tomography*, vol. 18, No. 2, 1994, pp. 192–205.

Perry, et el., "Emission and Transmission Spect Data Combination in Interactive 3d Image Presentation," *The Journal of Nuclear Medicine*, May 1989, p. 835.

Tsui, et al., "Three–dimensional Display Methods for Image Data Obtained with Spect," *European Journal of Nuclear Medicine*, Aug. 1989, p. 639.

Penn, et al., "Stereotactic Surgery with Image Processing of Computerized Tomographic Scans," *Neurosurgery*, vol. 3, No. 2, 1978, pp. 157–163.

Rosenman, et al., "Three–dimensional Display Techniques in Radiation Therapy Treatment Planning," *Int'l. Journal of Radiation Oncology Biology, Physics*, Jan. 1989, pp. 263–269.

Davis, et al., "Three–dimensional High–resolution Volume Rendering (HRVR) of Computed Tomography Data: Applications to Otolaryngology—Head and Neck Surgery," *Laryngoscope*, Jun. 1991, pp. 573–582.

Rosenman, et al., "Vistanet: Interactive Real–time Calculation and Display of 3–dimensional Radiation Dose: an Application of Gigabit Networking," *International Journal of Radiation Oncology Biology, Physics*, Jan. 1993, pp. 123–129.

Heinz, et al., "Examination of the Extracranial Carotid Bifurcation by Thin–section Dynamic Ct: Direct Visualization of Intimal Atheroma in Man (Part 1)," *American Journal of Neuroradiology*, Jul./Aug. 1984, pp. 355–359.

The Dynasight™ Sensor; a Precision Optical Radar.

High–performance Machine Vision for the VMEbus.

"The Future of Medicine," *The Economist*, pp. 1–18.

Hatch, "Reference–display System for the Integration of CT Scanning and the Operating Microscope," Master of Engineering Thesis, Dartmouth College, Hanover, N.H., Oct. 1984.

Maurer, et al., "A Review of Medical Image Registration," *Interactive Image–Guided Neurosurgery*, pp. 17–44, Sep. 21, 1993.

Written Opinion, PCT/US97/11563, International Preliminary Examining Authority, Sep. 21, 1998.

Yukio Kosugi et al., "An Articulated Neurosurgical Navigation System Using MRI and CT Images," *IEEE Transactions on Biomedical Engineering*, vol. 35, No. 2, pp. 147–152, Feb. 1988.

Ralph Mösges et al., "A New Imaging Method for Intraoperative Therapy Control in Skull–Base Surgery," *Neurosurg.*, Rev. 11, pp. 245–247, 1988.

David W. Roberts, M.D., et al., "A Frameless Stereotaxic Integration of Computerized Tomographic Imaging and the Operating Microscope,"*J. Neurosurg.*, vol. 65, pp. 545–549, Oct. 1986.

Arun–Angelo Patil, M.D., "Computed Tomography Plane of the Target Approach in Computed Tomographic Stereotaxis," *Neurosurgery*, vol. 15, No. 3, pp. 410–414, 1984.

H. Reinhardt, et al., "A Computer Assisted Device for the Intraoperative CT–Correlated Localization of Brain Tumors," *Eur. Surg. Res.*, vol. 20, pp. 52–58, 1988.

Eric H. Friets, et al., "A Frameless Stereotaxic Operating Microscope for Neurosurgery," *IEEE Transactions on Biomedical Engineering*, vol. 36, No. 6, Jun. 1989.

Pixsys, Inc., "SACDAC User's Guide, Version 2e," Mar. 1989, pp. 0–1 through 5–3.

Ludwig Adams et al., "Medical Imaging: Computer–Assisted Surgery," *IEEE Computer Graphics and Applications*, pp. 43–51, May 1990.

Eric E. Awwad et al., "MR Imaging of Lumbar Juxtaarticular Cysts," *Journal of Computer Assisted Tomography*, vol. 14 No. 3, pp. 415–417, May/Jun. 1990.

Eric E. Awwad et al., "Post–Traumatic Spinal Synovial Cyst with Spondylolysis CT Features," *Journal of Computer Assisted Tomography*, vol. 13, No. 2, pp. 334–337, Mar./Apr. 1989.

Edward C. Benzel et al., "Magnetic Source Imaging: A Review of the Magnes System of Biomagnetic Technologies Incorporated," *Neurosurgery*, vol. 33, No. 2, pp. 252–259, Aug. 1993.

L. Adams et al., "Aide Au Reperage Tridimensionnel Pour La Chirugie De La Base Du Crane," Innov. Tech. Biol. Med., vol. 13, No. 4, pp. 329–341, 1992.

Richard D. Bucholz et al., "A Comparison of Sonic Digitizers Versus Light Emitting Diode–Based Localization," *Interactive Image–Guided Neurosurgery*, Chapter 16, pp. 179–200.

Bucholz, R.D., et al., "Use of an Interoperative Optical Digitizer in a System for Free–Hand Stereotactic Surgery," Poster #1120, *Scientific Program*, 1992 Annual Meeting, American Association of Neurological Surgeons, San Francisco, CA, Apr. 11–16, 1992, pp. 284–285.

Richard D. Bucholz et al., "Image–Guided Surgical Techniques for Infections and Trauma of the Central Nervous System," *Neurosurgery Clinics of North America*, vol. 7, No. 2, pp. 187–200, Apr. 1996.

Richard D. Bucholz et al., "Intraoperative Localization Using a Three Dimensional Optical Digitizer," Proceedings of Clinical Applications of Modern Imaging Technology, vol. 1894, The International Society of Optical Engineering, pp. 312–322, Jan. 17–19, 1993.

Richard D. Bucholz et al., "Variables Affecting the Accuracy of Stereotactic Localization Using Computerized Tomography," *J. Neurosurg.*, vol. 79, pp. 667–673, Nov. 1993.

Richard D. Bucholz, "The Central Sulcus and Surgical Planning," *AJNR*, vol. 14, pp. 926–927, Jul./Aug. 1993.

Richard D. Bucholz et al., "Halo Vest Versus Spinal Fusion for cervical injury: evidence from an outcome study," *J. Neurosurg.*, vol. 70, No. 6, pp. 884–892, Jun. 1989.

Guillaume Champleboux, "Utilisation De Fonctions Splines Pour La Mise Au Point d'Un Capteur Tridimensional Sans Contact," Jul. 1991.

G. Champleboux, et al., "Accurate Calibration of Camerass and Range Imaging Sensors: the NPBS Method," IEEE Conference on Robitics and Automation, 1992.

P. Cinquin et al., "Computer Assisted Medical Interventions," *IARP*, pp. 63–65, Sep. 1989.

Philippe Cinquin et al., "IGOR: Image Guided Robot. Methodology, Applications," *IEEE EMBS*, pp. 1–2, 1992.

Bill Dever and S. James Zinreich, M.D., "OR role seen for 3–D imaging," *Radiology Today*, 2 pages, Feb. 1991.

Kevin T. Foley et al, "Image–Guided Intraoperative Spinal Localization," *Intraoperative Neuroprotection*, Chapter 19, pp. 325–340, 1996.

Christopher C. Gallen et al., "Intracranial Neurosurgery Guided by Functional Imaging," *Surg. Neurol.*, vol. 42, pp. 523–530, Jan. 3, 1994.

Edmund M. Glaser et al., "The Image–Combining Computer Microscope—an Interactive Instrument for Morphometry of the Nerous System," *Journal of Neuroscience Methods*, vol. 8, pp. 17–32, 1983.

Patrick Clarysse et al., "A Computer–Assisted System for 3–D Frameless Localization in Stereotaxic MRI," *IEEE TOMA*, vol. 10, No. 4, pp. 523–529, Dec. 1991.

John G. Golfinos et al., "Clinical Use of Frameless Stereotaxic Arm: results of 325 cases," *J. Neurosurg.*, vol. 83, No. 3, pp. 197–205, Aug. 1995.

J.F. Hatch et al., "Reference–Display System for the Integration of CT Scanning and the Operating Microscope," Proceedings of the Eleventh Annual Northeast Bioengineering Conference, pp. 252–254, Mar. 15, 1985.

Jaime M. Henderson et al., "An Accurate and Ergonomic Method of Registration for Image–Guided Neurosurgery," Computerized Medical Imaging and Graphics, vol. 18, No. 4, pp. 273–277, 1994.

Skip Jacques et al., "A Computerized Microstereotactic Method to Approach, 3–Dimensionally Reconstruct, Remove and Adjuvantly Treat Small CNS Lesions," *Appl. Neurophysiol.*, vol. 43, pp. 176–182, 1980.

Patrick J. Kelly, "Instrumentation, Technique and Technology," *Neurosurgery*, vol. 37, No. 2, pp. 348–350, Aug. 1995.

Douglas Kondziolka et al., "Guided Neurosurgery Using the ISG Viewing Wand," *Contemporary Neurosurgery*, vol. 17, No. 8, pp. 1–6, 1995.

Krybus et al., "Navigation Support for Surgery by Means of Optical Position Detection," Lehrstuhl fur MeBbtechnik.

S. Lavallee, "A New System for Computer Assisted Neurosurgery," IEEE Engineering in Medicine & Biology Society 11th Annual International Conference, 2 pages, 1989.

Stephane Lavallee, "Vi Adaptation De La Methdologie A Quelques Applications Cliniques," Lère Partie: Methodologie des GMCAO, Chapter VI, pp. 133–148.

S. Lavallee, et al, "Computer Assisted Driving of a Needle into the Brain," CAR, pp. 416–420, 1989.

S. Lavallee et al., "Computer Assisted Interventionist Imaging: The Instance of Stereotactic Brain Surgery," MED-INFO, pp. 613–617, 1989.

Mazier et al., "Chirurgie De La Colonne Vertebrale Assiste Par Ordinateur: Application Au Vissage Pediculaire," *Innov. Tech. Biol. Med.*, vol. 11, No. 5, pp. 559–566, 1990.

B. Mazier et al., "Computer Assisted Interventionist Imaging: Application to Vertebral Column Surgery," Annual International Conference of the IEEE Engineering in Medicine and Biology Society, vol. 12, No. 1, pp. 0430–0431, 1990.

F. Mesqui et al., "Real–Time, Noninvasive Recording and Three–Dimensional Display of the Functional Movements of an Arbitrary Mandible Point," *SPIE Biostereometrics '85*, vol. 602, pp. 77–84, Dec. 3–6, 1985.

Stéphane Lavellée et al., "Computer Assisted Medical Interventions," NATO ASI Series, vol. F60, pp. 302–312, 1990.

André Olivier et al., "Frameless stereotaxy for surgery of the epilepsies: preliminary experience" *J. Neurosurg.*, vol. 81, No. 4, pp. 629–633, Oct. 1994.

C.A. Pelizzari et al., "Interactive 3D Patient–Image Registration" Information Procession in Medical Imaging, Proceedings, pp. 132–141, Jul. 1991.

Richard D. Penn et al., "Stereotactic Surgery with Image Processing of Computerized Tomographics Scans," *Neurosurgery*, vol. 3, No. 2, pp. 157–163, May 26, 1978.

H. F. Reinhardt et al., "Mikrochirurgische Entfernung tiefliegender GefaBmiBbildungen mit Hilfe der sonar–Stereometrie," *Ultraschall in Med.* 12, pp. 80–84, 1991.

H. F. Reinhardt et al., "Neuronavigation: A Ten–Year Review," Neurosurgery, vol. 23, pp. 329–341 (1992).

Hans F. Reinhardt et al., "Sonic Stereometry in Microsurgical Procedures for Deep–Seated Brain Tumors and Vascular Malformations," *Neurosurgery*, vol. 32, No. 1, pp. 329–341, Jan. 1993.

Pascal Sautot, et al., "Computer Assisted Spine Surgery: a First Step Toward Clinical Application in Orthopaedics," *14th IEEE EMBS*, pp. 1071–1072, 1992.

Christine S. Siegel, "Creating 3D Models from Medical Images Using AVS," Research Paper, N.Y.U. School of Medicine, 4 pages.

D.A. Simon, et al., "Accuracy Validation in Image–Guided Orthopaedic Surgery," Research Paper, Canegei Mellon University and Shadyside Hospital, pp. 185–192.

Kurt R. Smith et al., "The Neurostation TM—A Highly Accurate, Minimally Invasive Solution to Frameless Stereotactic Neurosurgery," *Computerized Medical Imaging and Graphics*, vol. 18, No. 4, pp. 247–256, 1994.

Kurt R. Smith et al., "Multimodality Image Analysis and Display Methods for Improved Tumor Localization in Stereotactic Neurosurgery," Annual Conference of the IEEE Engineering in Medicine and Biology Society, vol. 13, No. 1, pp. 0210, 1991.

Watanabe, "Neuronavigator," *Iqaku–no–Ayumi*, vol. 137, No. 6, 4 pages, May 10, 1986 (with translation).

James M. Balter, et al., "Correlation of projection radiographs in radiation therapy using open curve segments and points," *Med. Phys.* 19 (2), Mar./Apr. 1992, pp. 329–334.

B. Leonard Holman, et al., Computer–Assisted Superimposition of Magnetic Resonance and High–Resolution Technetium–99–m–HMPAO and Thallium–201 SPECT Images of the Brain, *The Journal of Nuclear Medicine*, vol. 32, No. 8, Aug. 1991, pp. 1478–1484.

Kurt R. Smith, et al., "Computer Methods for Improved Diagnostic Image Display Applied to Stereotactic Neurosurgery," *Automedica*, vol. 14, pp. 371–382, 1992.

C.A. Pelizzari, et al., 3D Patient/Image Registration: Application to Radiation Treatment Planning, *Medical Physica*, vol. 18, No. 3, May/Jun. 1991, p. 612.

D.J. Valentino, et al., Three–Dimensional Visualization of Human Brain Structure–Function Relationships, *The Journal of Nuclear Medicine*, Oct. 1989, Posterboard 1136, vol. 30, No. 10, p. 1747.

David N. Levin, et al., "The Brain: Integrated Three–dimensional Display of MR and PET Images," *Radiology*, Sep. 1989, vol. 172, No. 3, pp. 783–789.

C.A. Pelizzari, et al., "Interactive 3D Patient–Image Registration," *Lecture Notes in Computer Science*, Springer–Verlag, Wye, UK, 1991 Proceedings, pp. 132–141.

D. Levin, et al., "Multimodality 3–D View of the Brain Created from MRI and PET Scans," *SMRI 1989: Seventh Annual Meeting Program and Abstracts*, vol. 7, Supplement 1, p. 89.

C.A. Pelizzari, et al., "Three Dimensional Correlation of PET, CT and MRI Images," *The Journal of Nuclear Medicine, Abstract Book*, 34th Annual Meeting, Toronto, Canada, 1987, vol. 28, No. 4, Poster Session No. 528, p. 682.

Patrick J. Kelly, M.D., et al., "A Stereotactic Approach to Deep–Seated Central Nervous System Neoplasms Using the Carbon Dioxide Laser," *Surgical Neurology*, vol. 15, No. 5, May 1981, pp. 331–334.

Skip Jacques, M.D., et al., "Computerized three–dimensional stereotaxic removal of small central nervous system lesions in patients," *J. Neurosurg*, vol. 53, No. 6, Dec. 1980, pp. 816–820.

P.J. Kelly, et al., "Precision Resection of Intra–Axial CNS Lesions by CT–Based Stereotactic Craniotomy and Computer Monitored $CO_2$ Laser," *Acta Neurochirurgica*, Springer–Verlag 1983, vol. 68, 1983, pp. 1–9.

Patrick J. Kelly, M..D., et al. "A Microstereotactic Approach to Deep–seated Arteriovenous Malformations," *Surgical Neurology*, vol. 17, No. 4, Apr. 1982, pp. 260–262.

Y.C. Shiu, et al., "Finding the Mounting Position of a Sensor by Solving a Homogeneous Transform Equation of Form AX=XB," *IEEE*, 1987, pp. 1666–1671.

K.S. Arun et al., "Transactions on Pattern Analysis and Machine Intelligence," *IEEE*, vol. PAMI–9, No. 5, 1987, pp. 698–770.

Castleman, Kenneth R., "Digital Image Processing," Prentice Hall, Inc., 1979, pp. 364–369.

Afshar, Farhad, et al., "A three–dimensional reconstruction of the human brain stem," *J. Neurosurg.*, vol. 57, Oct. 1982, pp. 491–495.

S. Lavalee, et al., "Matching 3–D Smooth Surfaces with their 2–d Projections using 3–D Distance Maps," SPIE, vol. 1570, 1991, pp. 322–336.

Bajcsy, Ruzena, et al., "Computerized Anatomy Atlas of the Human Brain," Proceedings of the Second Annual Conference & Exhibition of The National Computer Graphics Association, Inc., Jun. 14–18, 1981, pp. 435–441.

Batnitzky, Solomon, M.D., et al., "Three–Dimensional Computer Reconstructions of Brain Lesions from Surface Contours Provided by Computed Tomography: A Prospectus," *Neurosurgery*, vol. 11, No. 1, 1982, pp. 73–84.

Bergström, Mats, et al., "Stereotaxic Computed Tomography," *Am. J. Roentgenol*, 127:167–170, 1976, pp. 167–170.

Birg, W., et al., "A Computer Programme System for Stereotactic Neurosurgery," *Acta Neurochirurgica Suppl.*, 24, 1977, 99–108.

Boëthius, J., et al., "Stereotactic Biopsies and Computer Tomography in Gliomas," *Acta Neurochirurgica*, vol. 40, Fasc. 3–4, 1978, pp. 223–232.

Boëthius, J., et al., "Stereotaxic computerized tomography with a GE 8800 scanner," *J. Neurosurg*, vol. 52, 1980, pp. 794–800.

Brown, Russell A., M.D., "A computerized tomography–computer graphics approach to stereotaxic localization," *J. Neurosurg*, vol. 50, 1979, pp. 715–720.

Gildenberg, Philip L., M.D., et al., "Calculation of Stereotactic Coordinates from the Computed Tomographic Scan," *Neurosurgery*, vol. 10, No. 5, 1982, pp. 580–586.

Gleason, Curtis A., Ph.D., et al., "Stereotactic Localization (with Computerized Tomographic Scanning), Biopsy, and Radiofrequency Treatment of Deep Brain Lesions," *Neurosurgery*, vol. 2, No. 3, 1978, pp. 217–222.

Jacques, Skip, M.D., et al., "Computerized three–dimensional stereotaxic removal of small central nervous system lesions in patients," *J. Neurosurg*, vol. 53, Dec. 1980, pp. 816–820.

Lunsford, L. Dade, M.D., "Innovations in Stereotactic Technique Coupled with Computerized Tomography," *Contemporary Neurosurgery*, 1982, pp. 1–6.

Perry, John H., Ph.D., et al., "Computed Tomography–guided Stereotactic Surgery: Conception and Development of a New Stereotactic Methodology," *Neurosurgery*, vol. 7, No. 4, Oct. 1980, pp. 376–381.

Piskun, Walter S., Major, et al., "A Simplified Method of CT Assisted Localization and Biopsy of Intracranial Lesions," *Surgical Neurology*, vol. II, Jan.–Jun. 1979, pp. 413–417.

Scarabin, J.M., et al., "Stereotaxic Exploration in 200 Supratentorial Brain Tumors," *Neuroradiology*, vol. 16, Jun. 4–10, 1978, pp. 591–593.

Mundinger, F., et al., "Computer–Assisted Stereotactic Brain Operations by Means Including Computerized Axial Tomography," *Applied Neurophysiology*, vol. 41, Nos. 1–4, 1978, pp. 169–182.

Bookstein, Fred L., et al., "Edge information at landmarks in medical images," *Visualization in Biomedical Computing*, SPIE vol. 1808, 1992, pp. 242–258.

Bookstein, Fred L., "Landmark Methods for Forms Without Landmarks: Localizing Group Differences in Outline Shape," IEEE Proceedings of MMBIA '96, 1996, pp. 279–289.

Bookstein, Fred L., "Visualization Group Differences in Outline Shape: Methods from Biometrics of Landmark Points," Lecture Notes in Computer Science 1131, *Visualization in Biomedical Computing*, 4th International Conference, VBC '96, Sep. 1996, pp. 401–41–410.

Bookstein, Fred L., "Quadratic Variation of Deformations," Lecture Notes in Computer Science 1230, *Information processing in Medical Imaging*, 15th International Conference, IPMI '97, Jun. 1997, pp. 15–28.

Zorvech, S. James, M.D., "3–D in the OR OR role seen for 3–D imaging," *Radiology Today*, Feb. 1991.

PCT International Search Report, Nov. 14, 1997.

Lavallee et al., "Matching of Medical Images for Computed and Robot Assisted Surgery," *TIMB–TIM3–IMAG, Faculte de Medecine de Grenoble*.

Kaufman et al., "New Head–Positioning System for Use with Computed Tomographic Scanning," *Neurosurgery*, vol. 7, No. 2, pp. 147–149 (1980).

Bajesy et al., Abstract, pp. 435–441 (1981).

Batnitzky et al., "Three–Dimensional Computer Reconstructions of Brian Lesions from Surface Contours Provided by Co9mputed Tomography: A Prospectus," *Neurosurgery*, vol. 11, No. 1, Part 1, pp. 73–84 (1982).

Kelly et al., "Pecision Resection of Intra–Axial CNS Lesions by CT–Based Stereotactic Craniotomy and Computer Monitored $CO_2$ Laser," *Acta Neurochirurgica*, 68, pp. 1–9 (1983).

Foley et al., "Fundamentals of Interactive Computer Graphics." .

* cited by examiner

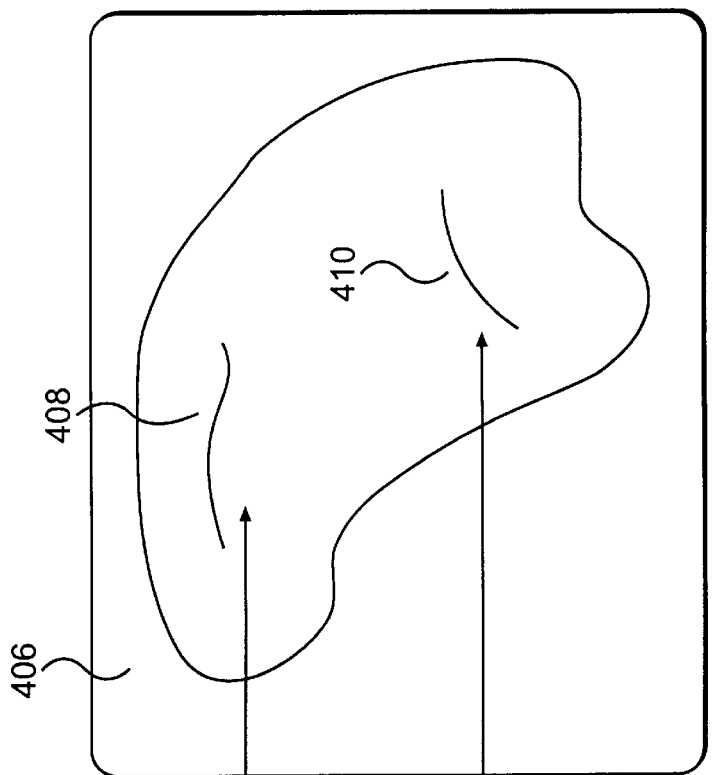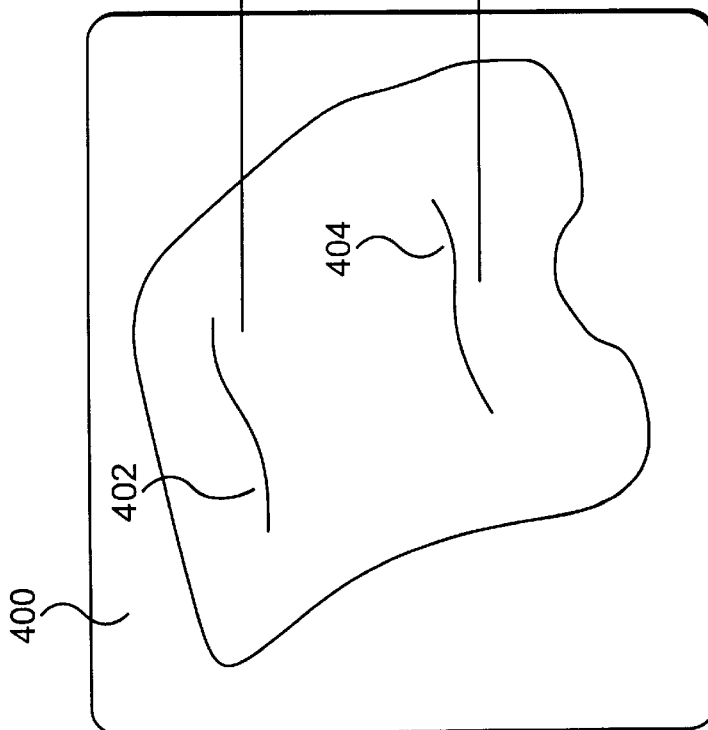
FIG. 4

RAPID CONVOLUTION BASED LARGE DEFORMATION IMAGE MATCHING VIA LANDMARK AND VOLUME IMAGERY

This is a continuation-in-part of prior U.S. patent application Ser. No. 08/678,628 filed Jul. 10, 1996 now U.S. Pat. No. 6,009,212 issued Dec. 28, 1999. This continuation-in-part claims priority to U.S. provisional application Ser. No. 60/064,615 filed Nov. 7, 1997 which is a continuation of PCT/US97/11563 filed Jul. 8, 1997, and incorporates the reference herein.

This work was supported in part by the following U.S. Government grants: NIH grants RR01380 and R01-MH52138-01A1 and ARO grant DAAL-03-86-K-01 10. The U.S. Government may have certain rights in the invention.

TECHNICAL FIELD

The present invention relates to image processing systems and methods, and more particularly to image registration systems that combine two or more images into a composite image in particular the fusion of anatomical manifold based knowledge with volume imagery via large deformation mapping which supports both kinds of information simultaneously, as well as individually, and which can be implemented on a rapid convolution FFT based computer system.

BACKGROUND ART

Image registration involves combining two or more images, or selected points from the images, to produce a composite image containing data from each of the registered images. During registration, a transformation is computed that maps related points among the combined images so that points defining the same structure in each of the combined images are correlated in the composite image.

Currently, practitioners follow two different registration techniques. The first requires that an individual with expertise in the structure of the object represented in the images label a set of landmarks in each of the images that are to be registered. For example, when registering two MRI images of different axial slices of a human head, a physician may label points, or a contour surrounding these points, corresponding to the cerebellum in two images. The two images are then registered by relying on a known relationship among the landmarks in the two brain images. The mathematics underlying this registration process is known as small deformation multi-target registration.

In the previous example of two brain images being registered, using a purely operator-driven approach, a set of N landmarks identified by the physician, represented by $x_i$, where i=1 . . . N, are defined within the two brain coordinate systems. A mapping relationship, mapping the N points selected in one image to the corresponding N points in the other image, is defined by the equation $u(x_i)=k_i$, where i=1 . . . N. Each of the coefficients, $k_i$, is assumed known.

The mapping relationship u(x) is extended from the set of N landmark points to the continuum using a linear quadratic form regularization optimization of the equation:

$$u = \arg \min_u \int \|Lu\|^2 \quad (1)$$

subject to the boundary constraints $u(x_i)=k_i$. The operator L is a linear differential operator. This linear optimization problem has a closed form solution. Selecting $L=\alpha\nabla^2+\beta\nabla$ $(\nabla.)$ gives rise to small deformation elasticity.

For a description of small deformation elasticity see S. Timoshenko, *Theory of Elasticity*, McGraw-Hill, 1934 (hereinafter referred to as Timoshenko) and R. L. Bisplinghoff, J. W. Marr, and T. H. H. Pian, *Statistics of Deformable Solids*, Dover Publications, Inc., 1965 (hereinafter referred to as Bisplinghoff). Selecting $L=\nabla^2$ gives rise to a membrane or Laplacian model. Others have used this operator in their work, see e.g., Amit, U. Grenander, and M. Piccioni, "Structural image restoration through deformable templates," *J American Statistical Association*. 86(414):376–387, June 1991, (hereinafter referred to as Amit) and R. Szeliski, *Bayesian Modeling of Uncertainty in Low-Level Vision*, Kluwer Academic Publisher, Boston, 1989 (hereinafter referred to as Szeliski) (also describing a bi-harmonic approach). Selecting $L=\nabla^4$ gives a spline or biharmonic registration method. For examples of applications using this operator see Grace Wahba, "*Spline Models for Observational Data*," Regional Conference Series in Applied Mathematics. SIAM, 1990, (hereinafter referred to as Whaba) and F. L. Bookstein, *The Measurement of Biological Shape and Shape Change*, volume 24, Springer-Verlag: Lecture Notes in Biomathematics, New York, 1978 (hereinafter referred to as Bookstein).

The second currently-practiced technique for image registration uses the mathematics of small deformation multi-target registration and is purely image data driven. Here, volume based imagery is generated of the two targets from which a coordinate system transformation i:; constructed. Using this approach, a distance measure, represented by the expression D(u), represents the distance between a template T(x) and a target image S(x). The optimization equation guiding the registration of the two images using a distance measure is:

$$u = \arg \min_u \int \|Lu\|^2 + D(u) \quad (2)$$

The distance measure D(u) measuring the disparity between imagery has various forms, e.g., the Gaussian squared error distance $\int |T(h(x))-S(x)|^2 dx$, a correlation distance, or a Kullback Liebler distance. Registration of the two images requires finding a mapping that minimizes this distance.

Other fusion approaches involve small deformation mapping coordinates $x \in \Omega$ of one set of imagery to a second set of imagery. Other techniques include the mapping of pre-defined landmarks and imagery, both taken separately such as in the work of Bookstein, or fused as covered via the approach developed by Miller-Joshi-Christensen-Grenander the '212 patent described in U.S. Pat. No. 6,009,212 (hereinafter "the '212 patent") herein incorporated by reference mapping coordinates $x \in \Omega$ of one target to a second target: The existing state of the art for small deformation matching can be stated as follows:

Small Deformation Matching: Construct h(x)=x−u(x) according to the minimization of the distance D(u) between the template and target imagery subject to the smoothness penalty defined by the linear differential operator L:

$$h(\cdot) = \cdot - u(\cdot) \text{ where } \hat{u} = \arg \min_u \int \|Lu\|^2 + \sum_{i=1}^{N} D(u). \quad (3)$$

The distance measure changes depending upon whether landmarks or imagery are being matched.

1. Landmarks alone. The first approach is purely operator driven in which a set of point landmarks $x_i$, i=1, ... N are defined within the two brain coordinate systems by, for example, an anatomical expert, or automated system from which the mapping is assumed known: $u(x_i)=k_i$, i=1, ..., N. The field u(x) specifying the mapping h is extended from the set of points $\{x_i\}$ identified in the target to the points $\{y_i\}$ measured with Gaussian error co-variances $\Sigma_i$:

$$\hat{u} = \arg\min_u \int \|Lu\|^2 + \sum_{i=1}^{N} (y_i - x_i - u(x_i))^t \Sigma^{-1} (y_i - x_i - u(x_i))^T \quad (4)$$

Here $(.)^{\tau}$ denotes transpose of the 3×1 real vectors, and L is a linear differential operator giving rise to small deformation elasticity (see Timoshenko and Bisplinghoff), the membrane of Laplacian model (see Amit and Szeliski), bi-harmonic (see Szeliski), and many of the spline methods (see Wahba and Bookstein). This is a linear optimization problem with closed form solution.

2. The second approach is purely volume image data driven, in which the volume based imagery is generated of the two targets from which the coordinate system transformation is constructed. For this a distance measure between the two images being registered $I_0$, $I_1$ is defined, $D(u)=\int |I_0(x-u(x))-I_1(x)|^2 dx$, giving the optimization by $$h(\cdot) = \cdot - u(\cdot) \text{ where } u = \quad (5)$$

$$\arg\min_u \int \|Lu\|^2 + \int |I_0(x-u(x)) - I_1(x)|^2 dx.$$

The data function D(u) measures the disparity between imagery and has been taken to be of various forms. Other distances are used besides just the Gaussian squared error distance, including correlation distance, Kullback Liebler distance, and others.

3. The algorithm for the transformation of imagery $I_0$ into imagery $I_1$ has landmark and volume imagery fused in the small deformation setting as in the '212 application. Both sources of information are combined into the small deformation registration:

$$u = \arg\min_u \int \|Lu\|^2 + D(u) + \sum_{i=1}^{N} \frac{\|y_i - x_i - u(x_i)\|^2}{\sigma_i^2} \quad (6)$$

Although small deformation methods provide geometrically meaningful deformations under conditions where the imagery being matched are small, linear, or affine changes from one image to the other. Small deformation mapping does not allow the automatic calculation of tangents, curvature, surface areas, and geometric properties of the imagery. To illustrate the mapping problem, the FIG. 9 shows an oval template image with several landmarks highlighted. FIG. 10 shows a target image that is greatly deformed from the template image. The target image is a largely deformed oval, twisted and deformed. FIG. 11 shows the results of image matching, when the four corners are fixed, using small deformation methods based on static quadratic form regularization. These are an illustration of the distortion which occurs with small deformation linear mapping methods between simply defined landmark points which define a motion which is a large deformation. As can be seen in FIG. 11, landmarks defined in the template image often map to more than one corresponding point in the target image.

The large deformation mapping allows us to produce maps for image registration in which the goal is find the one-to-one, onto, invertible, differentiable maps h (henceforth termed diffeomorphisms) from the coordinates x $\in \Omega$ of one target to a second target under the mapping $$h: x \rightarrow h(x)=x-u(x), x \in \Omega \quad (7)$$

To accommodate very fine variation in anatomy the diffeomorphic transformations constructed are of high dimensions having, for example dimension greater than 12 of the Affine transform and up-to the order of the number of voxels in the volume. A transformation is said to be diffeomorphic if the transformation form the template to the target is one-to-one, onto, invertible, and both the transformation and it's inverse are differentiable. A transformation is said to be one-to-one if no two distinct points in the template are mapped to the same point in the target. A transformation is said to be onto if every point in the target is mapped from a point in the template. The importance of generating diffeomorphisms is that tangents, curvature, surface areas, and geometric properties of the imagery can be calculated automatically. FIG. 12 illustrates the image mapping illustrated in FIG. 11 using diffeomorphic transformation.

SUMMARY OF THE INVENTION

The present invention overcomes the limitations of the conventional techniques of image registration by providing a methodology which combines, or fuses, some aspects of both, techniques of requiring an individual with expertise in the structure of the object represented in the images to label a set of landmarks in each image that are to be registered and use of mathematics of small deformation multi-target registration, which is purely image data driven. An embodiment consistent with the present invention uses landmark manifolds to produce a coarse registration, and subsequently incorporates image data to complete a fine registration of the template and target images.

Additional features and advantages of the invention will be set forth in the description which follows, and in part, will be apparent from the description, or may be learned by practicing the invention. The embodiments and other advantages of the invention will be realized and obtained by the method and apparatus particularly pointed out in the written description and the claims hereof as well as in the appended drawings.

To achieve these and other advantages and in accordance with the purpose of the invention, as embodied and broadly described, a method according to the invention for registering a template image and a target image comprises several steps, including defining manifold landmark points in the template image and identifying points in the target image corresponding to the defined manifold landmark points. Once these points have been identified, the method includes the steps of computing a transform relating the defined manifold landmark points in the template image to corresponding points in the target image; fusing the first transform with a distance measure to determine a second transform relating all points within a region of interest in the target image to the corresponding points in the template image; and registering the template image with the target image using this second transform.

Therefore it is another embodiment of the present invention to provide a new framework for fusing the two separate image registration approaches in the large deformation setting. It is a further embodiment of the large deformation method to allow for anatomical and clinical experts to study geometric properties of imagery alone. This will allow for the use of landmark information for registering imagery. Yet another embodiment consistent with the present invention allows for registration based on image matching alone. Still another embodiment consistent with the present invention combines these transformations which are diffeomorphisms and can therefore be composed.

An embodiment consistent with the present invention provides an efficient descent solution through the Lagrangian temporal path space-time solution of the landmark matching problem for situations when there are small numbers of landmarks N<<[Ω], reducing the Ω×T dimensional optimization to N, T-dimensional optimizations.

Another embodiment consistent with the present invention provides an efficient FFT based convolutional implementation of the image matching problem in Eulerian coordinates converting the optimization from real-valued functions on Ω×T to [T] optimizations on Ω.

To reformulate the classical small deformation solutions of the image registrations problems as large deformation solutions allowing for a precise algorithmic invention, proceeding from low-dimensional landmark information to high-dimensional volume information providing maps, which are one-to-one and onto, from which geometry of the image substructures may be studied. As the maps are diffeomorphisms, Riemannian lengths on curved surfaces, surface area, connected volume measures can all be computed guaranteed to be well defined because of the diffeomorphic nature of the maps.

It is also an embodiment consistent with the invention to introduce periodic and stationary properties into the covariance properties of the differential operator smoothing so that the solution involving inner-products can be implemented via convolutions and Fast Fourier transforms thus making the fusion solution computationally feasible in real time on serial computers Both the foregoing general description and the following detailed description are exemplary and explanatory and are intended to provide further explanation of the invention as claimed.

BRIEF DESCRIPTION OF THE DRAWINGS

The accompanying drawings provide a further understanding of the invention. They illustrate embodiments of the invention and, together with the description, explain the principles of the invention.

FIG. 4 is a target and a template image with 1-dimensional manifolds;

DETAILED DESCRIPTION OF THE INVENTION

1. Method for Image Registration Using Both Landmark Based knowledge and Image Data A method and system is disclosed which registers images using both landmark based knowledge and image data. Reference will now be made in detail to the present preferred embodiment of the invention, examples of which are illustrated in the accompanying drawings.

Figure 1:
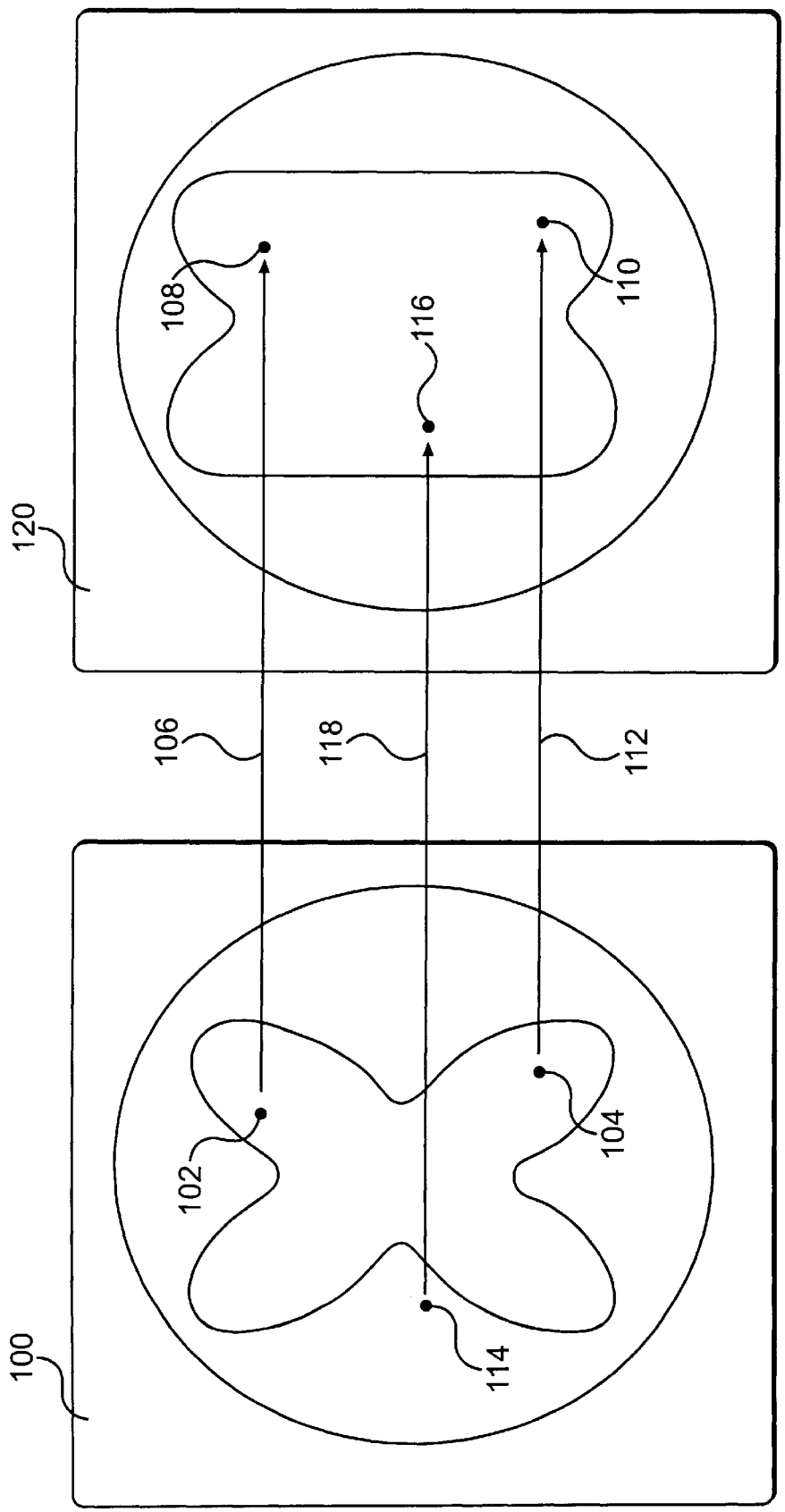
FIG. 1 is a target and template image of an axial section of a human head with 0-dimensional manifolds.

To illustrate the principles of this invention, FIG. 1 shows two axial views of a human head. In this example, template image 100 contains points 102, 104, and 114 identifying structural points (0-dimensional landmark manifolds) of interest in the template image. Target image 120 contains points 108, 110, 116, corresponding respectively to template image points 102, 104, 114, via vectors 106, 112, 118, respectively.

Figure 2:
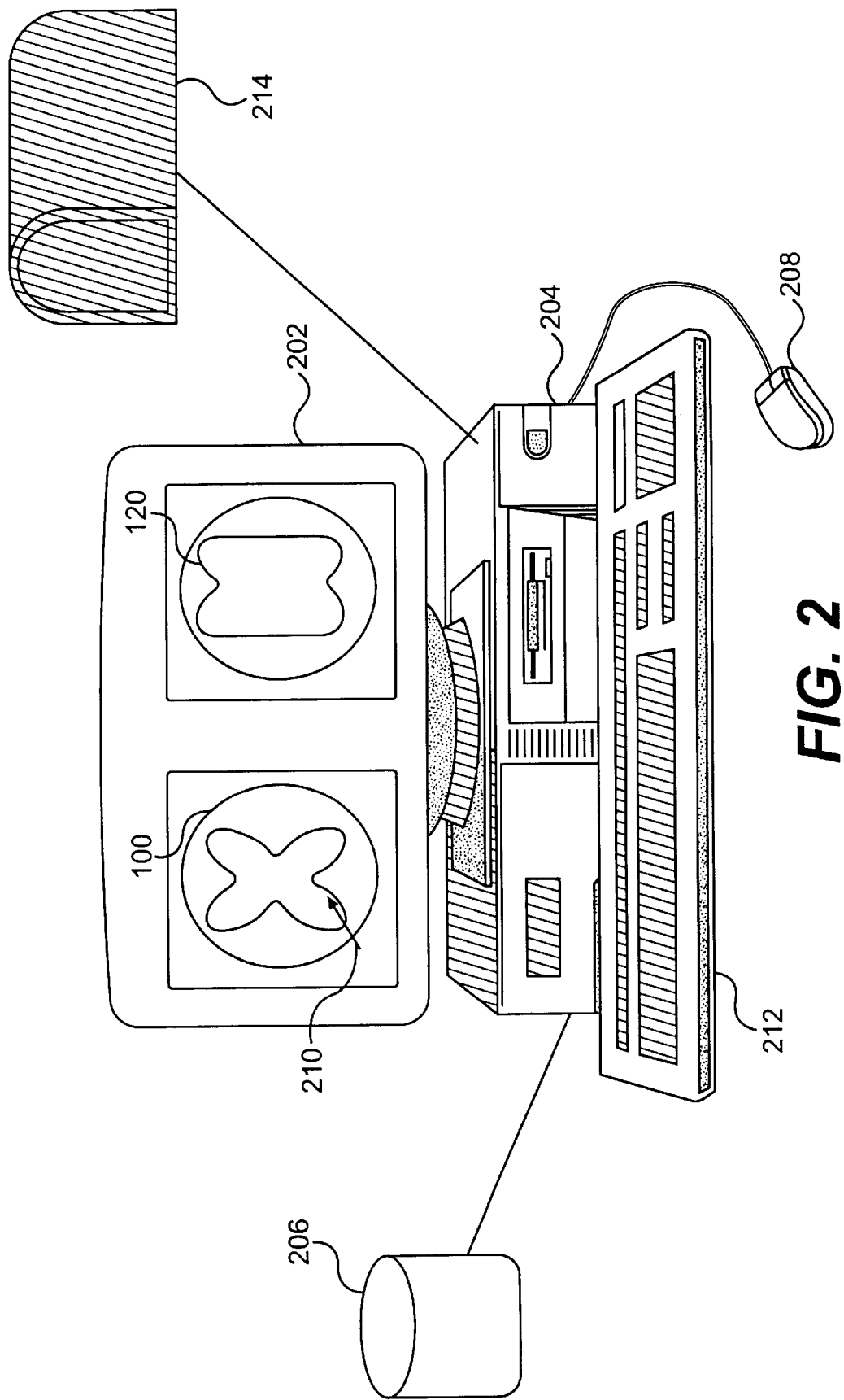
FIG. 2 is schematic diagram illustrating an apparatus for registering images in accordance with the present invention.

FIG. 2 shows apparatus to carry out the preferred embodiment of this invention. A medical imaging scanner 214 obtains the images show in FIG. 1 and stores them on a computer memory 206 which is connected to a computer central processing unit (CPU) 204. One of ordinary skill in the art will recognize that a parallel computer platform having multiple CPUs is also a suitable hardware platform for the present invention, including, but not limited to, massively parallel machines and workstations with multiple processors. Computer memory 206 can be directly connected to CPU 204, or this memory can be remotely connected through a communications network.

Registering images 100, 120 according to the present invention, unifies registration based on landmark deformations and image data transformation using a coarse-to-fine approach. In this approach, the highest dimensional transformation required during registration is computed from the solution of a sequence of lower dimensional problems driven by successive refinements. The method is based on information either provided by an operator, stored as defaults, or determined automatically about the various substructures of the template and the target, and varying degrees of knowledge about these substructures derived from anatomical imagery, acquired from modalities like CT, MRI, functional MRI, PET, ultrasound, SPECT, MEG, EEG, or cryosection.

Following this hierarchical approach, an operator, using pointing device 208, moves cursor 210 to select points 102, 104, 114 in FIG. 1, which are then displayed on a computer monitor 202 along with images 100, 120. Selected image points 102, 104, and 114 are 0-dimensional manifold landmarks.

Once the operator selects manifold landmark points 102, 104, and 114 in template image 100, the operator identifies the corresponding template image points 108, 110, 116.

Once manifold landmark selection is complete, CPU 204 computes a first transform relating the manifold landmark points in template image 100 to their corresponding image points in target image 120. Next, a second CPU 204 transform is computed by fusing the first transform relating selected manifold landmark points with a distance measure relating all image points in both template image 100 and target image 120. The operator can select an equation for the distance measure several ways including, but not limited to, selecting an equation from a list using pointing device 208, entering into CPU 204 an equation using keyboard 212, or reading a default equation from memory 206. Registration is completed by CPU 204 applying the second computed transform to all points in the template image 100.

Although several of the registration steps are described as selections made by an operator, implementation of the present invention is not limited to manual selection. For example, the transforms, boundary values, region of interest, and distance measure can be defaults read from memory or determined automatically.

Figure 3:
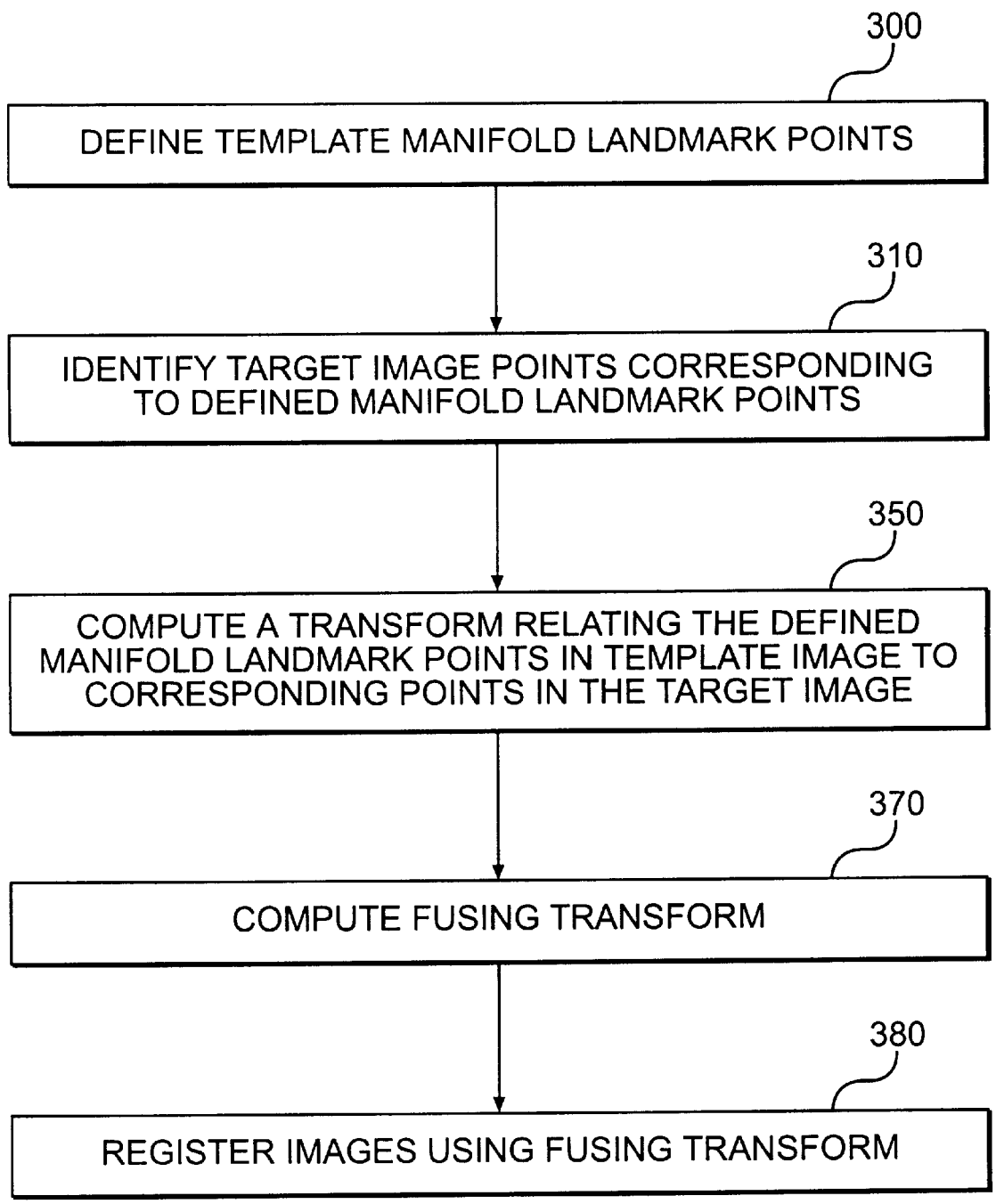
FIG. 3 is a flow diagram illustrating the method of image registration according to the present invention.

FIG. 3 illustrates the method of this invention in operation. First an operator defines a set of N manifold landmark points $x_i$, where i=1, ..., N, represented by the variable M, in the template image (step 300). These points should correspond to points that are easy to identify in the target image.

Associated with each landmark point, xi, in the template image, is a corresponding point $y_i$ in the target image. The operator therefore next identifies the corresponding points, $y_i$, in the target image are identified (step 310). The nature of this process means that the corresponding points can only be identified within some degree of accuracy. This mapping between the template and target points can be specified with a resolution having a Gaussian error of variance $\sigma^2$.

If a transformation operator has not been designated, the operator can choose a manifold landmark transformation operator, L, for this transformation computation. In this embodiment, the Laplacian $$\left(\nabla = \frac{\partial^2}{\partial x_1^2} + \frac{\partial^2}{\partial x_2^2} + \frac{\partial_2}{\partial x_3^2}\right)$$

is a is used for the operator L. Similarly, the operator can also select boundary values for the calculation corresponding to assumed boundary conditions, if these values have not been automatically determined or stored as default values. Here, infinite boundary conditions are assumed, producing the following equation for K, where $K(x,x_i)$ is the Green's function of a volume landmark transformation operator $L^2$ (assuming L is self-adjoint):

$$K(x, x_i) = \begin{bmatrix} \|x - x_i\| & 0 & 0 \\ 0 & \|x - x_i\| & 0 \\ 0 & 0 & \|x - x_i\| \end{bmatrix} \quad (8)$$

Using circulant boundary conditions instead of infinite boundary conditions provides and embodiment suitable for rapid computation. One of ordinary skill in the art will recognize that other operators can be used in place of the Laplacian operator, such operators include, but are not limited to, the biharmonic operator, linear elasticity operator, and other powers of these operators.

In addition, the operator may select a region of interest in the target image. Restricting the computation to a relatively small region of interest reduces both computation and storage requirements because transformation is computed only over a subregion of interest. It is also possible that in some applications the entire image is the desired region of interest. In other applications, there may be default regions of interest that are automatically identified.

The number of computations required is proportional to the number of points in the region of interest, so the computational savings equals the ratio of the total number of points in the image to the number of points in the region of interest. The data storage savings for an image with N points with a region of interest having M points is a factor of N/M. For example, for a volume image of 256×256×256 points with a region of interest of 128×128×128 points, the computation time and the data storage are reduced by a factor of eight.

In addition, performing the computation only over the region of interest makes it necessary only to store a subregion, providing a data storage savings for the template image, the target image, and the transform values.

Following the identification of template manifold landmark points and corresponding points in the target image, as well as selection of the manifold transformation operator, the boundary values, and the region of interest, CPU 204 computes a transform that embodies the mapping relationship between these two sets of points (step 350). This transform can be estimated using Bayesian optimization, using the following equation:

$$\hat{u} = \arg\min_u \int_\Omega |Lu|^2 + \sum_{i=1}^{N} \frac{|y_i - x_i + u(x_i)|^2}{\sigma_i^2}, \quad (9)$$

the minimizer, u, having the form $$\hat{u}(x) = b + Ax + \sum_{i=1}^{N} \beta_i K(x, x_i) \quad (10)$$

where A is a 3×3 matrix, b=[$b_1$, $b_2$, $b_3$] is a 3×1 vector, [$\beta_{i1}$, $\beta_{i2}$, $\beta_{i3}$] is a 3×1 weighting vector.

The foregoing steps of the image registration method provide a coarse matching of a template and a target image. Fine matching of the images requires using the full image data and the landmark information and involves selecting a distance measure by solving a synthesis equation that simultaneously maps selected image landmarks in the template and target images and matches all image points within a region of interest. An example of this synthesis equation is:

$$\hat{u} = \arg\min_u \gamma \int_\Omega |T(x - u(x)) - S(x)|^2 \, dx + \quad (11)$$

$$\int_\Omega |Lu|^2 + \sum_{i=1}^{N} \frac{|y_i - x_i + u(x_i)|^2}{\sigma_i^2}$$

here the displacement field u is constrained to have the form $$u(x) = \sum_{k=0}^{d} \mu_k \phi_k(x) + \sum_{i=1}^{N} \beta_i K(x, x_i) + Ax + b \quad (12)$$

with the variables $\beta_i$, A, and b, computed at step 350 in FIG. 3. The operator L in equation (11) may be the same operator used in equation (9), or alternatively, another operator may be used with a different set of boundary conditions. The basis functions $\phi$ are the eigen functions of operators such as the Laplacian Lu=$\nabla^2$u, the bi-harmonic Lu=$\nabla^4$u, linear elasticity Lu=$\alpha\nabla^2$u+$(\alpha+\beta)\nabla(\nabla.u)$, and powers of these operators $L^P$ for p $\geq$ 1.

One of ordinary skill in the art will recognize that there are many possible forms of the synthesis equation. For example, in the synthesis equation presented above, the distance measure in the first term measures the relative position of points in the target image with respect to points in the template image. Although this synthesis equation uses a quadratic distance measure, one of ordinary skill in the art will recognize that there are other suitable distance measures.

CPU 204 then computes a second or fusing transformation (Step 370) using the synthesis equation relating all points within a region of interest in the target image to all corresponding points in the template image. The synthesis equation is defined so that the resulting transform incorporates, or fuses, the mapping of manifold landmarks to corresponding target image points determined when calculating the first transform.

The computation using the synthesis equation is accomplished by solving a sequence of optimization problems from coarse to fine scale via estimation of the basis coefficients $\mu_k$. This is analogous to multi-grid methods, but here the notion of refinement from coarse to fine is accomplished by increasing the number of basis components d. As the number of basis functions increases, smaller and smaller variabilities between the template and target are accommodated. The basis coefficients are determined by gradient descent, i.e., $$\mu_k^{(n+1)} = \mu_k^{(n)} - \Delta \frac{\partial H(u^{(n)} | S)}{\partial \mu_k} \quad (13)$$

where $$\frac{\partial H(u^{(n)})}{\partial \mu_k} = -\gamma \int_\Omega (T(x - u^{(n)}(x)) - \quad (14)$$

$$S(x))\nabla T(x - u^{(n)}(x)) \cdot \varphi_k(x) dx +$$

$$\lambda_k^2 \mu_k^{(n)} + \left(2 + \sum_{i=1}^{N} \frac{y_i - x_i + u^{(n)}(x_i)}{\sigma_i^2}\right) \cdot \varphi_k(x_i)$$

and $$u^{(n)}(x) = \sum_{k=0}^{d} \mu_k^{(n)} \varphi_k(x) + \sum_{i=1}^{N} \beta_i K(x, x_i) + Ax + b \quad (15)$$

also $\Delta$ is a fixed step size and $\lambda_k$ are the eigenvalues of the eigenvectors $\phi_k$.

Figure 8:
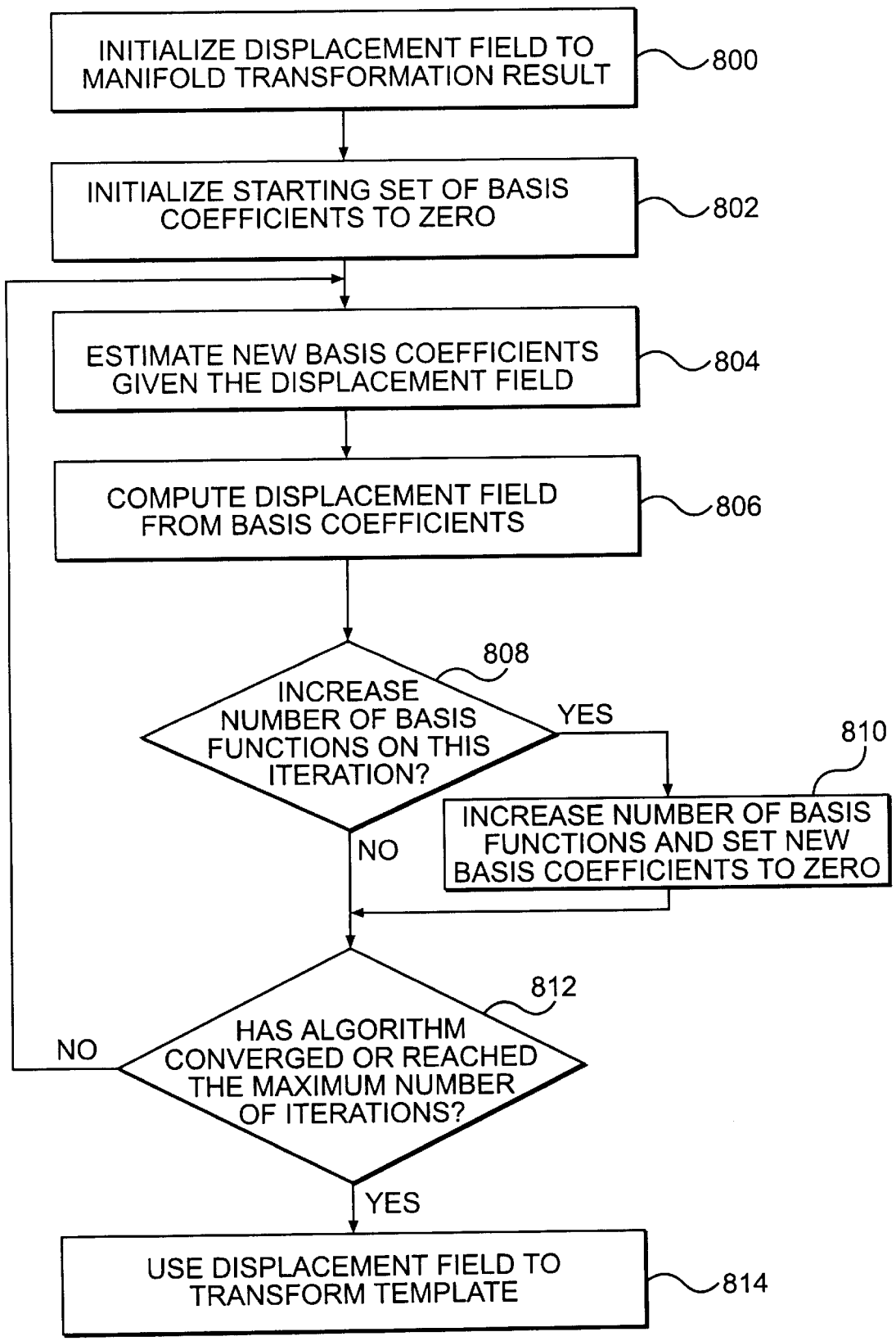
FIG. 8 is a flow diagram illustrating the computation of a fusing transform.
Figure 9:
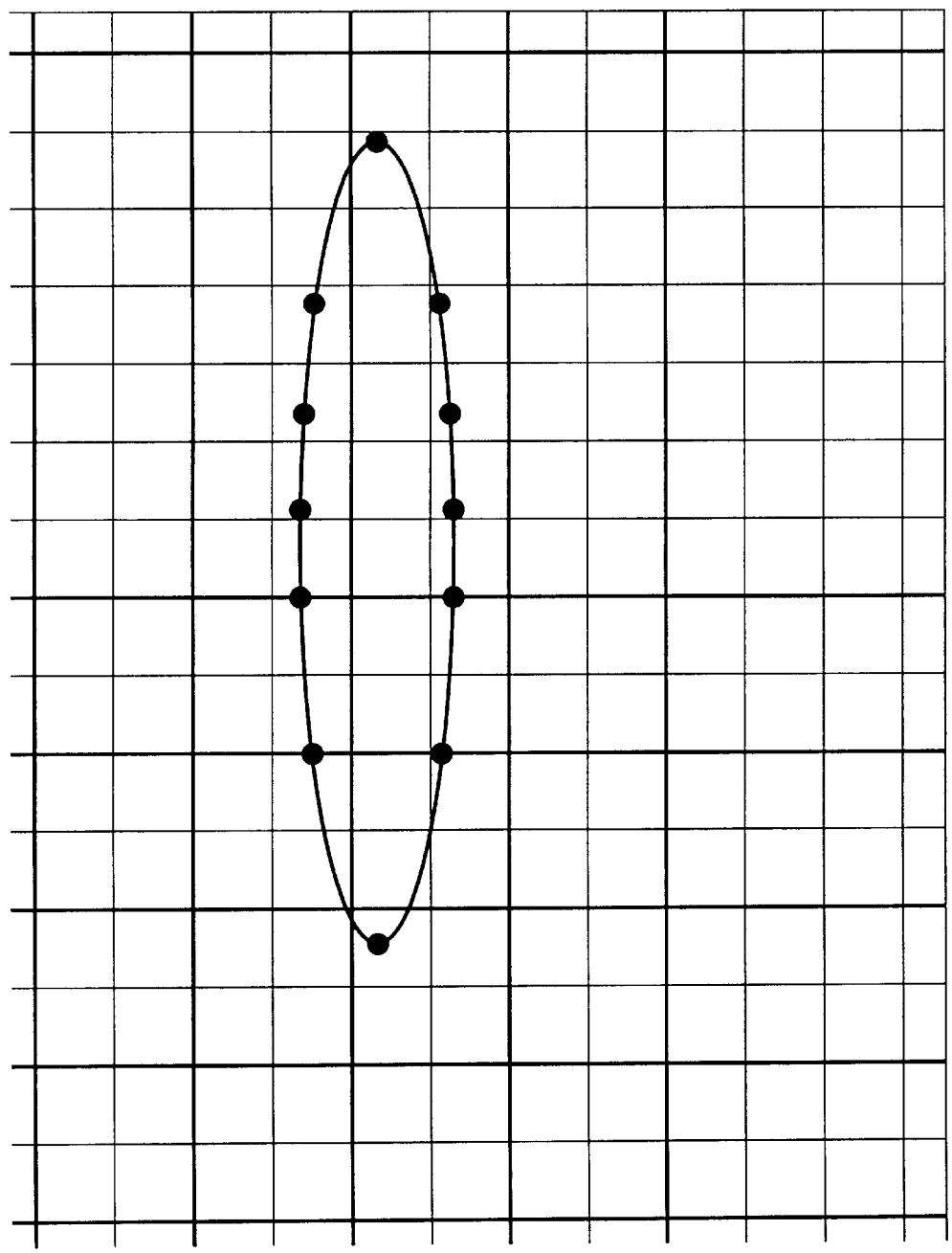
FIG. 9 is an oval template image which has landmark points selected and highlighted.
Figure 10:
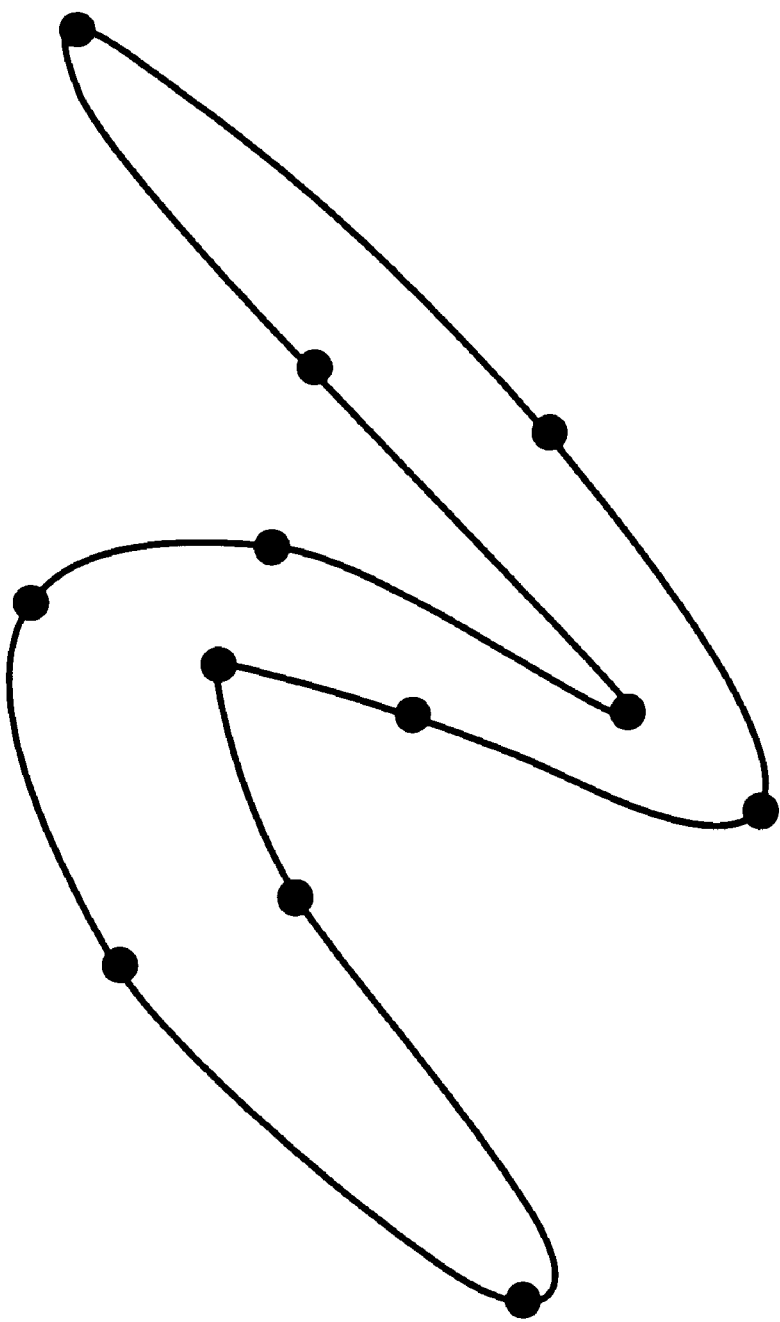
FIG. 10 is a deformed and distorted oval target image with corresponding landmark points highlighted and selected.
Figure 11:
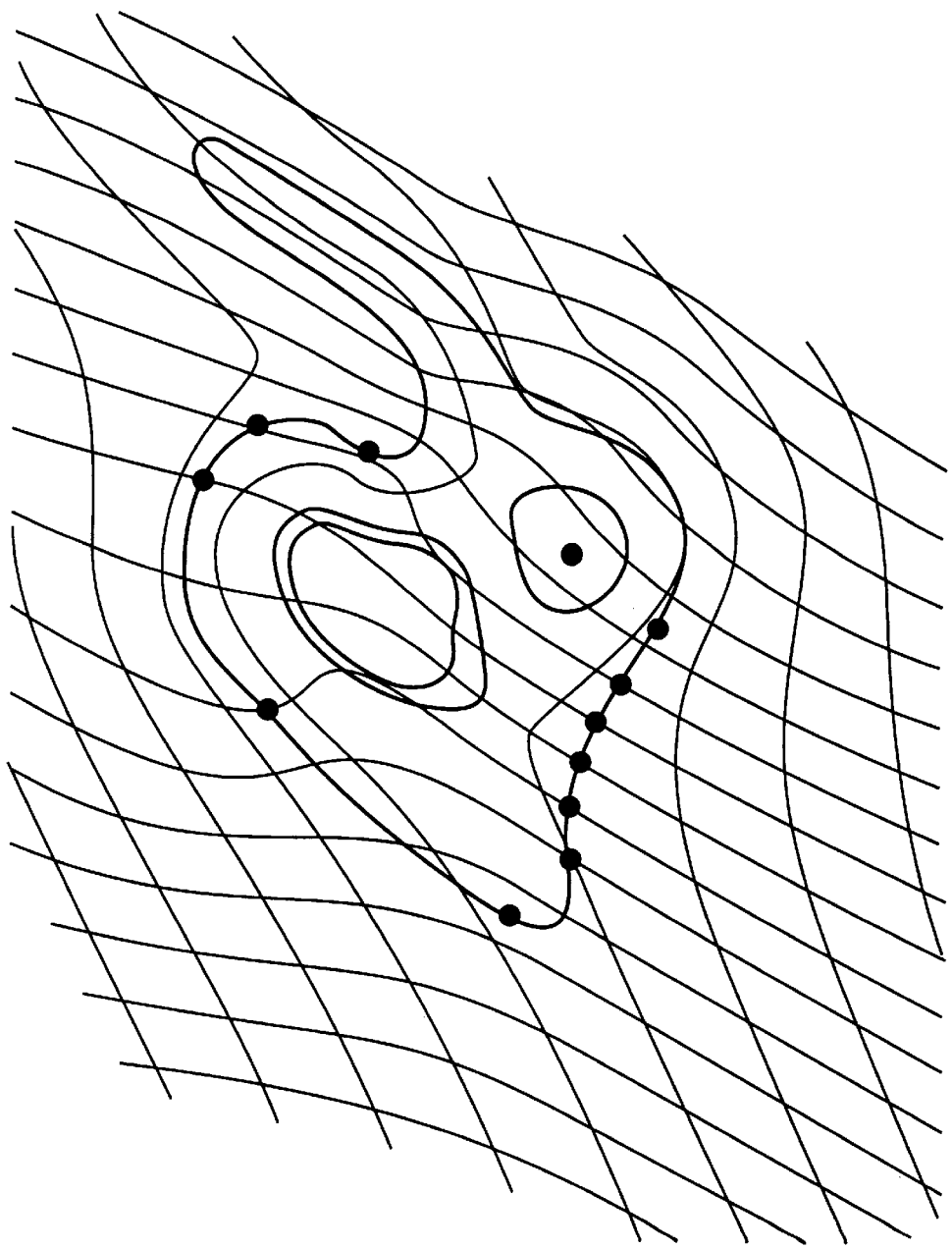
FIG. 11 is an image matching of the oval target and template images.
Figure 12:
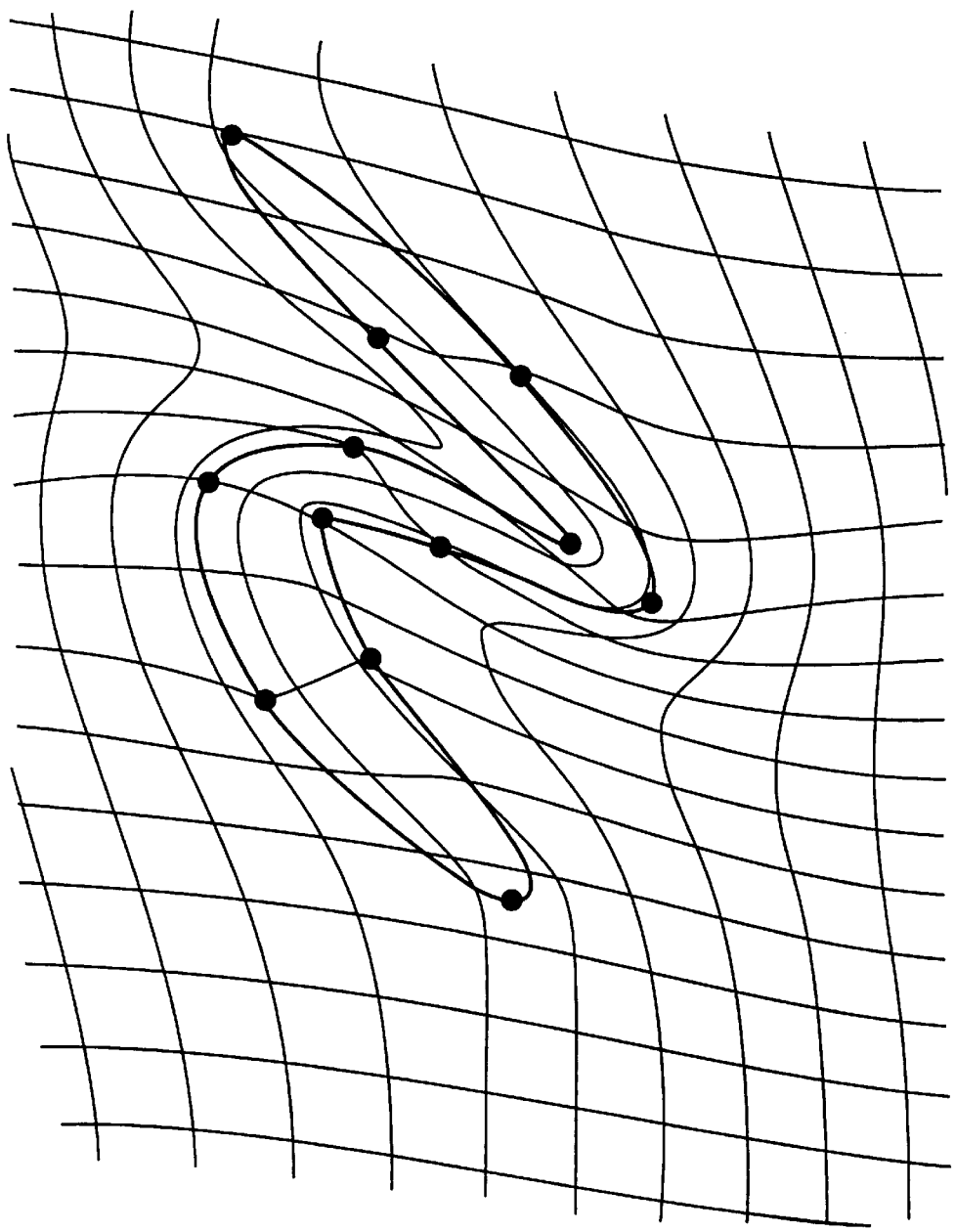
FIG. 12 is an image matching using diffeomorphism.

The computation of the fusion transformation (step 370) using the synthesis equation is presented in the flow chart of FIG. 8. Equation (12) is used to initialize the value of the displacement field $u(x)=u^{(0)}(x)$ (step 800). The basis coefficients $\mu_k=\mu_k^{(0)}$ are set equal to zero and the variables $\beta_i$, A, and b are set equal to the solution of equation (11) (step 802). Equation (13) is then used to estimate the new values of the basis coefficients $\mu_k^{(n+1)}$ given the current estimate of the displacement field $u^{(n)}(x)$ (step 804). Equation (15) is then used to compute the new estimate of the displacement field $u^{(n)}(x)$ given the current estimate of the basis coefficients $\mu_k^{(n)}$ (step 806). The next part of the computation is to decide whether or not to increase the number d of basis functions $\phi_k$ used to represent the transformation (step 808). Increasing the number of basis functions allows more deformation. Normally, the algorithm is started with a small number of basis functions corresponding to low frequency eigen functions and then on defined iterations the number of frequencies is increased by one (step 810). This coarse-to-fine strategy matches larger structures before smaller structures. The preceding computations (steps 804–810) are repeated until the computation has converged or the maximum number of iterations is reached (step 812). The final displacement field is then used to transform the template image (step 814).

Once CPU 204 determines the transform from the synthesis equation fusing both landmark manifold information and image data, CPU 204 uses this transform to register the template image with the target image (step 380).

The spectrum of the second transformation, h, is highly concentrated around zero. This means that the spectrum mostly contains low frequency components. Using the sampling theorem, the transformation can be represented by a subsampled version provided that the sampling frequency is greater than the Nyquist frequency of the transformation. The computation may be accelerated by computing the transformation on a coarse grid and extending it to the full voxel lattice e.g., in the case of 3D images, by interpolation. The computational complexity of the algorithm is proportional to the dimension of the lattice on which the transformation is computed. Therefore, the computation acceleration equals the ratio of the full voxel lattice to the coarse computational lattice.

One of ordinary skill in the art will recognize that composing the landmark transformations followed by the elastic basis transformations, thereby applying the fusion methodology in sequence can provide an alternatively valid approach to hierarchial synthesis of landmark and image information in the segmentation.

Another way to increase the efficiency of the algorithm is to precompute the Green's functions and eigen functions of the operator L and store these precomputed values in a lookup table. These tables replace the computation of these functions at each iteration with a table lookup. This approach exploits the symmetry of Green's functions and eigen functions of the operator L so that very little computer memory is required. In the case of the Green's functions, the radial symmetry is exploited by precomputing the Green's function only along a radial direction.

The method described for fusing landmark information with the image data transformation can be extended from landmarks that are individual points (0-dimensional manifolds) to manifolds of dimensions 1, 2 and 3 corresponding to curves (1-dimensional), surfaces (2-dimensional) and subvolumes (3-dimensional).

Figure 5:
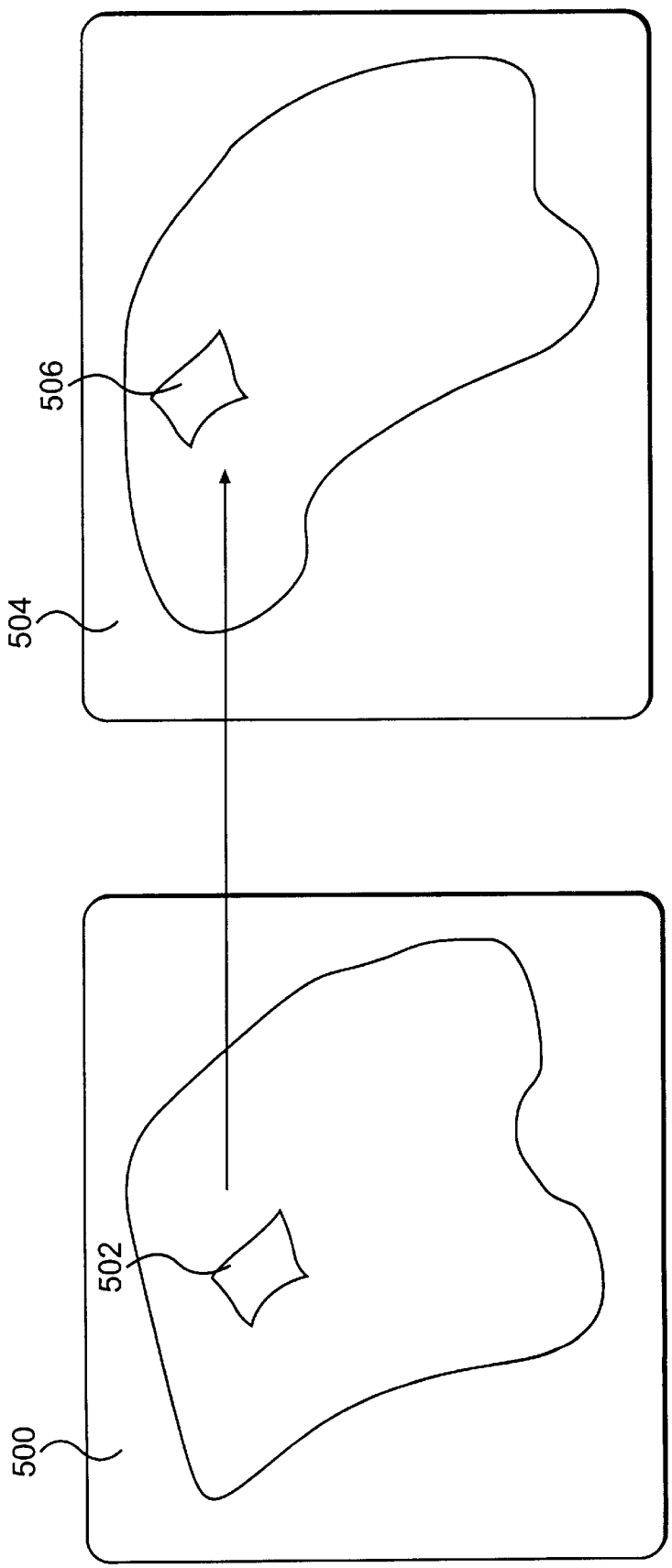
FIG. 5 is a target and a template image with 2-dimensional manifolds.
Figure 6:
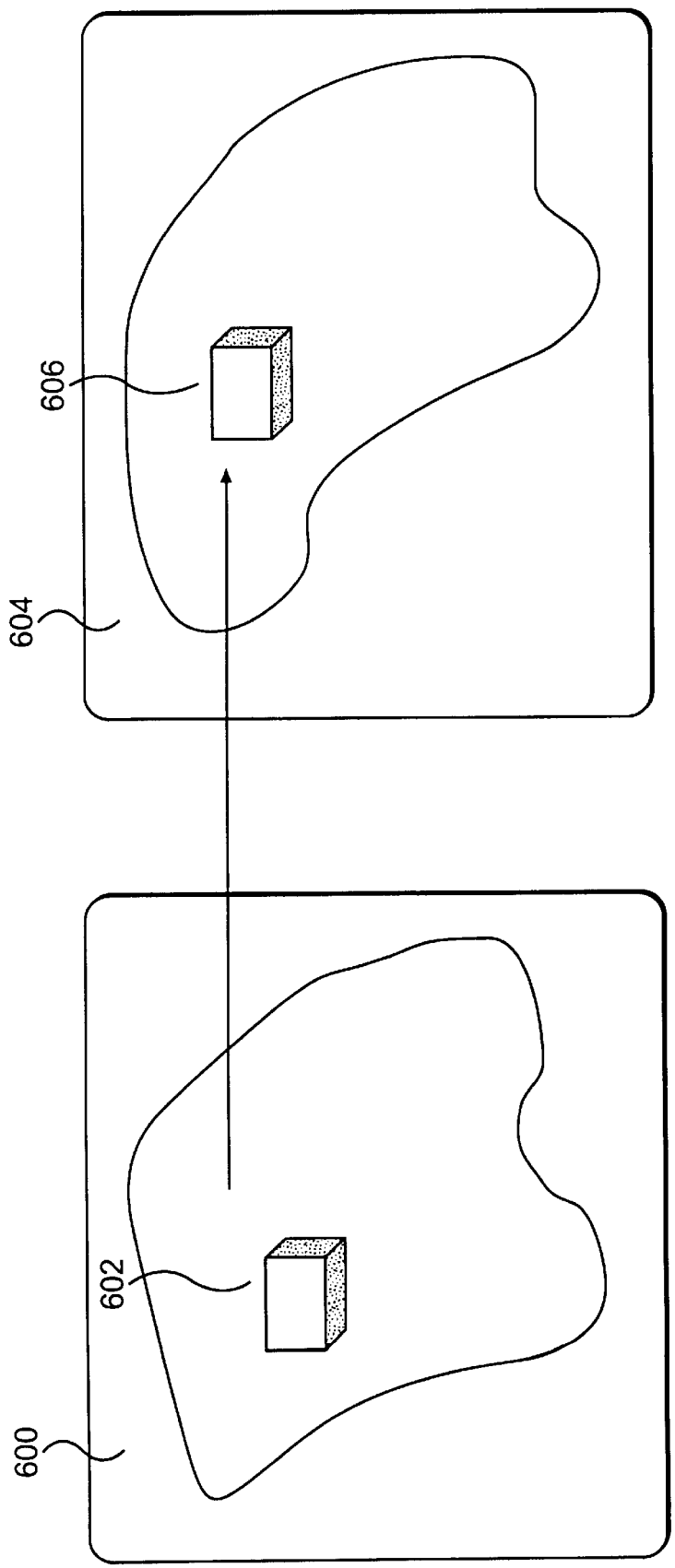
FIG. 6 is a target and a template image with 3-dimensional manifolds.

For example, FIG. 4 shows a template image 400 of a section of a brain with 1-dimensional manifolds 402 and 404 corresponding to target image 406 1-dimensional manifolds 408 and 410 respectively. FIG. 5 shows a template image 500 of a section of a brain with 2-dimensional manifold 502 corresponding to target image 504 2-dimensional manifold 506. FIG. 6 shows a template image 600 of a section of a brain with 3-dimensional manifold 602 corresponding to target image 604 3-dimensional manifold 606.

As with the point landmarks, these higher dimensional manifolds condition the transformation, that is we assume that the vector field mapping the manifolds in the template to the data is given. Under this assumption the manually-assisted deformation (step 350, FIG. 3) becomes the equality-constrained Bayesian optimization problem:

$$u(x) = \arg \min_u \int_\Omega |Lu(x)|^2 dx \quad (16)$$

subject to $$u(x) = k(x), x \in \bigcup_{i=0}^{3} M(i). \quad (17)$$

If M(i) is a smooth manifold for i=0, 1, 2, 3, the solution to this minimization is unique-satisfying L†Lû(x)=0, for all template points in the selected manifold. This implies that the solution can be written in the form of a Fredholm integral equation:

$$\hat{u}(x) = \int_{\cup_{i=0}^{3} M(i)} K(x, y)\beta(y) dS(y), \text{ where } K = GG^{\dagger} \quad (18)$$

and G the Green's function of L.

When the manifold is a sub-volume, M(3), dS is the Lebesgue measure on $R^3$. For 2-dimensional surfaces, dS is the surface measure on M(2), For 1-dimensional manifolds (curves), dS is the line measure on M(1) and for point landmarks, M(0), dS is the atomic measure. For point landmarks, the Fredholm integral equation degenerates into a summation given by equation (10).

When the manifold of interest is a smooth, 2-dimensional surface, the solution satisfies the classical Dirichlet boundary value problem:

$$L^{\dagger}L\hat{u}(x)=0, \forall x \in \Omega \backslash M \quad (19)$$

The Dirichlet problem is solved using the method of successive over relaxation as follows. If $u^k(x)$ is the estimate of a deformation field at the $k^{th}$ iteration, the estimate at the $(k+1)^{th}$ iteration is given by the following update equation:

$$u^{k+1}(x) = u^k(x) + \alpha L^{\dagger} L u(x), x \in \Omega \backslash M$$

$$u^{k+1}(x) = k(x), x \in M, \quad (20)$$

where $\alpha$ is the over relaxation factor.

It is also possible to- compute the transform (step 370) with rapid convergence by solving a series of linear minimization problems where the solution to the series of linear problems converges to the solution of the nonlinear problem. This avoids needing to solve the nonlinear minimization problem directly. Using a conjugate gradient method, the computation converges faster than a direct solution of the synthesis equation because the basis coefficients $\mu_k$ are updated with optimal step sizes.

Using the conjugate gradient, the displacement field is assumed to have the form $$u(x) = \sum_{k=0}^{d} \mu_k \varphi_k(x) + f(x) \quad (21)$$

where $$f(x) = \sum_{i=1}^{N} \beta_i K(x, x_i) + Ax + b. \quad (22)$$

Begin by assuming that $f(x)$ is fixed. This is generalized below. The eigen functions in the expansion are all real and follow the assumption that $\{\phi_i(x)\}$ are $R^3$ valued.

The minimization problem is solved by computing $$\mu_j^{new} = \mu_j^{old} + \Delta_j = 0 \ldots d \quad (23)$$

to update the basis coefficients in equation (21) where $\mu_j = 0, j = 0 \ldots d$ initially, $\Delta_j$ is computed using the equation $$\Delta j = \quad (24)$$

$$\left( \int_{\Omega} \left( \sum_{k=0}^{d} h_k(x) \right) h_j(x) dx + \lambda_j^2 + \frac{1}{\sigma^2} \sum_{i=1}^{N} \theta_{jj}(x_i) \right)^{-1} \left( \int_{\Omega} (T(x - u(x)) - S(x)) h_j(x) dx + \sum_{i=1}^{N} \beta_i \cdot \right.$$

$$\left. \varphi_j(x_i) + \frac{1}{\sigma^2} \sum_{i=1}^{N} (y_i - x_i + u(x_i)) \cdot \varphi_j(x_i) + \frac{1}{\sigma^2} \sum_{i=N}^{N} \theta_{kj}(x_i) \right).$$

where $h_i(x) = \nabla T|_{x-u(x)} \cdot \phi_i(x)$, and where $\theta_{ij}(x) = \phi_i(x) \cdot \phi_j(x)$. The notation f·g is the inner-product, i.e., $$f \cdot g = \sum_{i=1}^{3} f_i g_i \text{ for } f, g \in \mathbb{R}^3.$$

Similarly, since u(x) is written in the series expansion given in equations (21) and (22), the identical formulation for updating $\beta_i$ arises. Accordingly, the fusion achieved by the present invention results. Computation of equation (23) repeats until all $\Delta_j$ fall below a predetermined threshold solving for each $\Delta_j$ in sequence of increasing j, and $\Delta_4$, is computed using the values of $\Delta_k$ for $0 \leq k < j$.

A further improvement over prior art image registration methods is achieved by computing the required transforms using fast Fourier transforms (FFT). Implementing an FFT based computation for image registration using a synthesis equation, as required at step 370 of FIG. 3, provides computational efficiency. However, to exploit the known computational efficiencies of FFT transforms, the solution of the synthesis equation must be recast to transform the inner products required by iterative algorithms into shift invariant convolutions.

To make the inner-products required by the iterative algorithms into shift invariant convolution, differential and difference operators are defined on a periodic version of the unit cube and the discrete lattice cube. Thus, the operators are made cyclo-stationary, implying their eigen functions are always of the form of complex exponentials on these cubes having the value:

$$\Psi_k^{(r)} = \begin{bmatrix} c_{1k}^{(r)} \\ c_{2k}^{(r)} \\ c_{3k}^{(r)} \end{bmatrix} e^{j\langle \omega_k, x \rangle}. \quad (25)$$

r=1, 2, 3 with $x=(x_1, x_2, x_3) \in [0, 1]^3$, $\omega_{ki}=2\pi k_i$, i=1, 2, 3, and the Fourier basis for periodic functions on $[0, 1]^3$ takes the form $$e^{j\langle\omega_k,x\rangle}, \omega_k x \rangle = \omega_{k_1}x_1+\omega_{k_2}x_2+\omega_{k_3}x_3 \quad k=(\omega_{k_1},\omega_{k_2},\omega_{k_3})$$

On the discrete $N^3$=periodic lattice, $$\omega_k = \left(\frac{2\pi k_1}{N}, \frac{2\pi k_2}{N}, \frac{2\pi k_3}{N}\right), x \in \{0, 1 \ldots N-1\}^3.$$

For real expansions, the eigen vectors becomes $\phi_k(x)=\Psi_k(x)+\Psi_k^*(x)$ and the real expansion in equation (21) becomes:

$$u(x) = \sum_{k=0}^{d} \mu_k (\Psi_k(x) + \Psi_k^*(x)) \tag{26}$$

where * means complex conjugate, and $$0 < d \leq \frac{N}{2}.$$

This reformulation supports an efficient implementation of the image registration process using the FFT. Specifically, if step 370 of FIG. 3, computing the registration transform fusing landmark and image data, is implemented using the conjugate gradient method, the computation will involve a series of inner products. Using the FFT exploits the structure of the eigen functions and the computational efficiency of the FFT to compute these inner-products.

For example, one form of a synthesis equation for executing Step 370 of FIG. 3 will include the following three terms:

Term 1: $\int_\Omega (T(x - u(x)) - S(x)) h_j(x) dx$

Term 2: $\int_\Omega \left(\sum_{k=0}^{d} h_k(x)\right) h_j(x) dx$

Term 3: $u(x) = \sum_{k=0}^{d} \mu_k \varphi_k(x)$

Each of theses terms must be recast in a suitable form for FFT computation. One example of a proper reformulation for each of these terms is:

Term 1:

$$\int_\Omega (T(x-u(x)) - S(x)) \nabla T \cdot (\Psi_i^r(x) + \Psi_i^{(r)*}(x)) dx = \tag{27}$$

$$2\text{Re}\left(\int_\Omega (T(x-u(x)) - S(x)) \left(\sum_{r=1}^{3} \nabla T \cdot c_k^{(r)}\right) e^{j\langle\omega_k, x\rangle} dx\right),$$

where $$c_k^{(r)} = [c_{1k}^{(r)}, c_{2k}^{(r)}, c_{3k}^{(r)}]^t.$$

This equation is computed for all k by a Fourier transformation of the function.

$$(T(x-u(x)) - S(x)) \left(\sum_{r=1}^{3} \nabla T \cdot c_k^{(r)}\right) \tag{28}$$

and hence can be computed efficiently using a 3-D FFT.

Term 2:

$$\sum_{r=1}^{3} \sum_{k=0}^{d} \int (\Psi_j^{(r)} + \Psi_j^{(r)*}) (\nabla T (\nabla T)^t)(\Psi_j^{(r)} + \Psi_j^{(r)*}) dx = \tag{29}$$

$$2\text{Re}\left(\sum_{r=1}^{3} \sum_{k=0}^{d} (c_k^{(r)})^t \left(\int_\Omega (\nabla T(\nabla T)^t) e^{j\langle\omega_k+\omega_j, x\rangle} dx\right)\right)$$

The integral in the above summation for all k can be computed by Fourier transforming the elements of the 3×3 matrix:

$$\nabla T(\nabla T)^t \tag{30}$$

evaluated at $\omega_k+\omega_j$. Because this matrix has diagonal symmetry, the nine FFTs in this reformulation of term 2 can be computed efficiently using six three dimensional FFTs evaluated at $\omega_k+\omega_j$.

Term 3:

Using the exact form for the eigen functions we can rewrite the above equation as $$u(x) = 2\text{Re}\left(\sum_{r=1}^{3} \sum_{k=0}^{d} \mu_k^{(r)} \begin{bmatrix} c_{1k}^{(r)} \\ c_{2k}^{(r)} \\ c_{3k}^{(r)} \end{bmatrix} e^{j\langle\omega_k, x\rangle}\right). \tag{31}$$

This summation is precisely the inverse Fourier transforms of the functions $$\sum_{r=1}^{3} \mu_k^{(r)} c_{ik}^{(r)} \quad \text{for } i = 1, 2, 3$$

and hence can be computed efficiently by using a 3-D FFT.

One of ordinary skill in the art will recognize that restructuring the computation of registration transforms using FFTs will improve the performance of any image registration method having terms similar to those resulting from a synthesis equation fusing landmark and image data. Improvement results from the fact that many computer platforms compute FFTs efficiently; accordingly, reformulating the registration process as an FFT computation, makes the required computations feasible.

A distance function used to measure the disparity between images is the Gaussian square error distance $\int |T(x-u(x))-S(x)|^2 dx$. There are many other forms of an appropriate distance measure. More generally, distance functions, such as the correlation distance, or the Kullback Liebler distance, can be written in the form $\int D(T(x-u(x)), S(x)) dx$.

An efficient convolution implementation can be derived using the FFT for arbitrary distance functions. Computing the fusing transform using the image data follows the equation:

$$\hat{u} = \arg\min_u \gamma \int_\Omega D(T(x-u(x)), S(x)) dx + \tag{32}$$

$$\int_\Omega |Lu|^2 + \sum_{i=1}^{N} \frac{|y_i - x_i + u(x_i)|^2}{\sigma_i^2}$$

where $D(.,.)$ is a distance function relating points in the template and target images. The displacement field is assumed to have the form:

$$u(x) = \sum_{k=0}^{d} \mu_k \varphi_k(x) + f(x) \tag{33}$$

and $$f(x) = b + Ax + \sum_{i=1}^{N} \beta_i K(x, x_i) \tag{34}$$

is fixed. The basis coefficients $\{\mu_k\}$ are determined by gradient descent, i.e., $$\mu_k^{(n+1)} = \mu_k^{(n)} - \Delta \frac{\partial H(u^{(n)} | S)}{\partial \mu_k} \tag{35}$$

where the gradient is computed using the chain rule and is given by the equation $$\frac{\partial H(u^{(n)})}{\partial \mu_k} = \int_\Omega D'(T(x - u^{(n)}(x)), S(x)) \nabla T(x - u^{(n)}(x)) \cdot \varphi_k(x) dx + \lambda_k^2 \mu_k^{(n)} + \left( 2 \sum_{i=1}^{N} \frac{y_i - x_i + u^{(n)}(x_i)}{\sigma_i^2} \right) \cdot \varphi_k^{(x)} \tag{36}$$

where $D'(.,.)$ is the derivative with respect to the first argument. The most computationally intensive aspect of the algorithm is the computation of the term $$\int_\Omega D'(T(x - u^{(n)}(x)), S(x)) \nabla T(x - u^{(n)}(x)) \cdot \varphi_k(x) dx$$

Using the structure of the eigen functions and the computational efficiency of the FFT to compute these inner-products, the above term can be written as $$2 Re \int_\Omega D'(T(x - u^{(n)}(x)), S(x)) \left( \sum_{r=1}^{3} \nabla T \cdot c_k^{(r)} \right) e^{j(\omega_k, x)} dx$$

where $$c_k^{(r)} = [c_{1k}^{(r)}, c_{2k}^{(r)}, c_{3k}^{(r)}]^t$$

This equation is computed for all k by a Fourier transformation of the function $$D'(T(x - u^{(n)}(x)), S(x)) \left( \sum_{r=1}^{3} \nabla T \cdot c_k^{(r)} \right)$$

and hence can be computed efficiently using a 3-D FFT.

The following example illustrates the computational efficiencies achieved using FFTs for image registration instead of direct computation of inner-products. Assuming that a target image is discretized on a lattice having $N^3$ points, each of the inner-products in the algorithm, if computed directly, would have a computational complexity of the order $(N^3)^2$. Because the inner-products are computationally intensive, the overall complexity of image registration is also $(N^3)^2$. In contrast, each of the FFTs proposed has a computational complexity on the order of $N^3 \log_2 N^3$. The speed up is given by the ratio $N^6/(N^3 \log_2 N^3) = N^3/(3 \log_2 N)$. Thus the speed up is 64 times for a 16×16×16 volume and greater than $3.2 \times 10^4$ speed up for a 256×256×256 volume.

A further factor of two savings in computation time can be gained by exploiting the fact that all of the FFTs are real. Hence all of the FFTs can be computed with corresponding complex FFTs of half the number of points. For a development of the mathematics of FFTs see, A. V. Oppenheim and R. W. Schafer, *Digital Signal Processing,* Prentice-Hall, N.J., 1975 (hereinafter referred to as Oppenheim).

Alternative embodiments of the registration method described can be achieved by changing the boundary conditions of the operator. In the disclosed embodiment, the minimization problem is formulated with cyclic boundary conditions. One of ordinary skill in the art will recognize that alternative boundary conditions, such as the Dirichlet, Neumann, or mixed Dirichlet and Neumann boundary conditions are also suitable. The following equation is used in an embodiment of the present invention using one set of mixed Dirichlet and Neumann boundary conditions:

$$\left. \frac{\partial u_i}{\partial x_i} \right|_{(x|x_i=k)} = u_i(x | x_j = k) = 0 \tag{39}$$

for $i, j = 1, 2, 3; i \ne j; k = 0, 1$:

where the notation $(x|x_i=k)$ means x is in the template image such that $x_i=k$. In this case, the eigen functions would be of the form:

$$\varphi_k^{(r)} = \begin{bmatrix} C_{1k}^{(r)} \cos\omega_{k1}x_1 \sin\omega_{k2}x_2 \sin\omega_{k3}x_3 \\ C_{2k}^{(r)} \sin\omega_{k1}x_1 \cos\omega_{k2}x_2 \sin\omega_{k3}x_3 \\ C_{3k}^{(r)} \sin\omega_{k1}x_1 \sin\omega_{k2}x_2 \cos\omega_{k3}x_3 \end{bmatrix} \text{ for } r = 1, 2, 3. \tag{38}$$

Modifying boundary conditions requires modifying the butterflies of the FFT from complex exponentials to appropriate sines and cosines.

Figure 7:
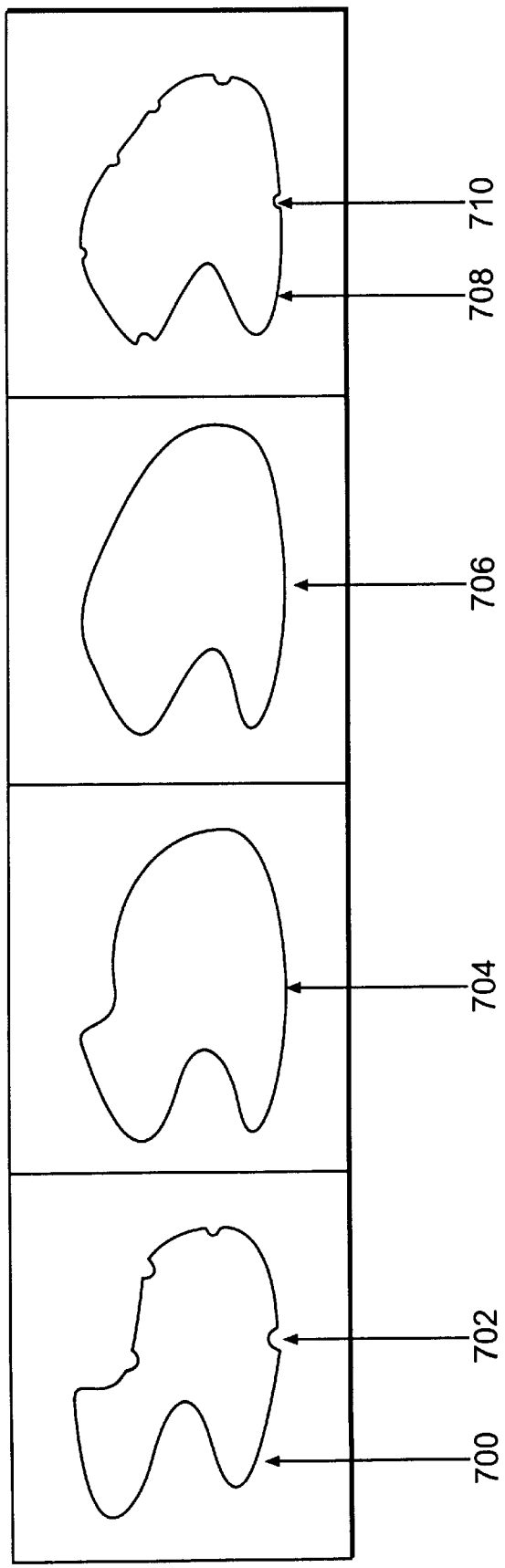
FIG. 7 is sequence of images illustrating registration of a template and target image.

In FIG. 7, four images, template image 700, image 704, image 706, and target image 708, illustrate the sequence of registering a template image and a target image. Template image 700 has 0-dimensional landmark manifolds 702. Applying the landmark manifold transform computed at step 350 in FIG. 3 to image 700 produces image 704. Applying a second transform computed using the synthesis equation combining landmark manifolds and image data to image 700 produces image 706. Image 706 is the final result of registering template image 700 with target image 708. Landmark manifold 710 in image 708 corresponds to landmark manifold 702 in template image 700.

Turning now to techniques to register images which may possess large deformation characteristics using diffeomorphisms, large deformation transform functions and transformations capable of matching images where the changes from one image to the other are greater than small, linear, or affine. Use of large deformation transforms provide for the automatic calculation of tangents, curvature, surface areas, and geometric properties of the imagery.

2. Methods for Large Deformation Landmark Based and Image Based Transformations

An embodiment consistent with the present invention maps sets of landmarks in imagery $\{x_i, i=1,2,\ldots,N\} \subset \Omega$ into target landmarks $\{y_i, i=1,\ldots,N\}$, and or imagery $I_0$ into target $I_1$, both with and without landmarks. For example when there is a well-defined distance function $D(u(T))$ expressing the distance between the landmarks and or imagery. The large deformation maps h: $\Omega \to \Omega$ are constructed by introducing the time variable, $$h: (x, t)=(x_1,x_2,x_3, t)\in\Omega\times[0,T] \to h(x,t)=(x_1-u_1(x,t),x_2-u_2(x,t),x_3-u_3(x,t))\in\Omega.$$

The large deformation maps are constrained to be the solution $h(x, T)=x-u(x, T)$ where $u(x, T)$ is generated as the solution of the ordinary differential equation $$u(x, T) = \int_o^T (I - \nabla u(x, t))v(x, t)dt, \quad (39)$$

where $v(x, t) = \sum_{k=0}^{\infty} v_k \phi_k(x, t), (x, t) \in \Omega x[0, T]$ assuming that the $\{\phi_k\}$ forms a complete orthonormal base.

Then a diffeomorphism for the landmark and image matching problems is given by the mapping of the imagery given by $h(x, T)=x-\hat{u}(x, T)$ satisfying the Ordinary Differential Equation (O.D.E.)

$$\hat{u}(x, T) = \int_o^T (I - \nabla \hat{u}(x, t))\hat{v}(x, y)dt \quad (40)$$

where $$\hat{v}(x, t) = arg_{v_i}, \min_{k=1,\ldots} \int_o^T \int_\Omega \|Lv(x, t)\|^2 dxdt + D(u(T)). \quad (41)$$

L is preferably a linear differential operator with the k forming a complete orthonormal base as the eigen functions $L\phi_k = \lambda_k \phi_k$.

2.1 Large Deformation Landmark Matching

In order to register images with large deformation using a landmark matching technique, N landmarks are identified in the two anatomies target $\{x_i, y_i, i=1, 2, \ldots, N\}$. The landmarks are identified with varying degrees of accuracy $\{\Sigma_i, i=1, \ldots, N\}$, the $\Sigma_i$, 3×3 covariance matrices. The distance between the target and template imagery landmarks preferably used is defined to be $$D_1(u(T)) \doteq \sum_{i=1}^{N} (y_i - x_i - u(x_i, T))\sum_{i}^{-1} (y_i - x_i - u(x_i, T)). \quad (42)$$

A preferable diffeomorphism is the minimizer of Eqns. 40, 41 with $D(u(T))$ the landmark distance:

$$\hat{u}(x, T) = \int_0^T (I - \nabla u(x, t))\hat{v}(x, t)dt \quad (43)$$

where $$\hat{v}(x, t) = arg \min_{v_k, k=1,\ldots} (H(u)(T)) \quad (44)$$

$$\doteq \int_o^T \int_\Omega \|Lv(x, t)\|^2 dxdt + D_1(u(T)).$$

A method for registering images consistent with the present invention preferably includes the following steps:

STEP 0: Define a set of landmarks in the template which can be easily identified in the target $\{x_i: x_i \in \Omega, i=1, 2, \ldots, N\}$ with varying degrees of accuracy in the target as $\{y_i, i=1, \ldots, N\}$ with associated error covariance $\{\Sigma_i, i=1, \ldots, N\}$, and initialize for n=0, v.=0.

STEP 1: Calculate velocity and deformation fields:

$$v^{(n)}(x, t) = \sum_{k=0}^{\infty} v_k^{(n)} \phi_k(x, t), u^{(n)}(x, T) \quad (45)$$

$$= \int_o^T (I - \nabla u^{(n)}(x, t))v^{(n)}(x, t)dt.$$

STEP 2: Solve via a sequence of optimization problems from coarse to fine scale via estimation of the basis coefficients $\{v_k\}$, analogous to multi-grid methods with the notion of refinement from coarse to fine accomplished by increasing the number of basis components. For each $v_k$, $$v_k^{(n+1)} = v_k^{(n)} - \nabla \frac{\partial H(v^{(n)})}{\partial v_k} = v_k^{(n)} - \nabla \left( \lambda_k^2 v_k^{(n)} = \frac{\partial D(u^{(n)}(T))}{\partial v_k} \right) \quad (46)$$

where (1) $\frac{\partial D(u(T))}{\partial v_k} = -2 \sum_{i=1}^{N} \left\langle y_i - x_i - u^{(n)}(x, T), \frac{\partial u^{(n)}(x, T)}{\partial \gamma_k} \right\rangle$ (2) $\frac{\partial u^{(n)}(x, T)}{\partial v_k} = \int_o^T (I - \nabla u^{(n)}(x, t))\phi_k(x, t)dt -$ $\int_o^T \nabla \frac{\partial u^{(n)}(x, t)}{\partial v_k} v^{(n)}(x, t)dt.$ STEP 3: Set $n \leftarrow n+1$, and return to Step 1.

2.2 Large Deformation Image Matching

Turning now to the technique where a target and template image with large deformation are registered using the image matching technique. The distance between the target and template image is chosen in accordance with Eqn. 47. A diffeomorphic map is computed using an image transformation operator and image transformation boundary values relating the template image to the target image. Subsequently the template image is registered with the target image using the diffromorphic map.

Given two images $I_0$, $I_1$, choose the distance $$D_2(u(T)) \doteq \gamma \int_{[0,1]^3} |I_0(x-u(x,T)) - I_1(x)|^2 dx. \quad (47)$$

The large deformation image distance driven map is constrained to be the solution $h(x,T)=x-\hat{u}(x,T)$ where $$\hat{u}(x, T) = \int_o^T (I - \nabla \hat{u}(x, t))\hat{v}(x, t)dt \quad (48)$$

and $$\hat{v}(x, t) = \quad (49)$$

$$arg \min_{\{V: v(x,t) = \sum_k v_k \phi_k\}} \left( H(v) \doteq \int_o^T \int_\Omega \|Lv(x, t)\|^2 dxdt + D_2(u(T)) \right).$$

A method for registering images consistent with the present invention preferably includes the following steps:

STEP 0: Measure two images $I_0$, $I_1$ defined on the unit cube $\Omega \doteq [0,1]^3 \subset R^3$, initialize parameters for n=0, $v_k^{(n)}=0$, k=0, 1, ..., and define distance measure $D(u(T))$ Eqn. 47.

STEP 1: Calculate velocity and deformation fields from $v^{(n)}$:

$$v^{(n)}(x,t) = \sum_{k=0}^{\infty} v_k^{(n)} \phi_k(x,t), \; u^{(n)}(x,T)$$

$$= \int_0^T (1 - \nabla u^{(n)}(x,t)) v^{(n)}(x,t) dt. \quad (50)$$

STEP 2: Solve optimization via sequence of optimization problems from coarse to fine scale via re-estimation of the basis coefficients $\{v_k\}$, analogous to multi-grid methods with the notion of refinement from coarse to fine accomplished by increasing the number of basis components. For each $v_k$, $$v_k^{(n+1)} \doteq v_k^{(k)} - \nabla \frac{\partial H(v^{(n)})}{\partial v_k} \quad (51)$$

$$= v_k^{(n)} - \nabla \left( \lambda_k^2 v_k^{(n)} + \frac{\partial D(u^{(n)}(T))}{\partial v_k} \right)$$

where (1) $\left. \frac{\partial D(u(T))}{\partial v_k} \right|_{u^{(n)}} = -2\gamma$      (52)

$$\int_\Omega (I_0(x - u^{(n)}(x,T)) - I_1(x)) \nabla_u I_0(x - u^{(n)}(x,T)) \cdot \frac{\partial u^{(n)}(x,T)}{\partial v_k} dx$$

STEP 3: Set n←n+1, and return to Step 1.

The velocity field can be constructed with various boundary conditions, for example $v(x,t)=0$, $x \in \partial\Omega$ and $t \in [0, T]$, $u(x, 0)=v(x, 0)=0$. The differential operator L can be chosen to be any in a class of linear differential operators; we have used operators of the form $(-a\Delta - b\nabla\nabla\cdot + cI)^P$, $p \geq 1$. The operators are 3×3 matrices $$\nabla^T u = \begin{pmatrix} \frac{\partial u_1}{\partial x_1} & \frac{\partial u_1}{\partial x_2} & \frac{\partial u_1}{\partial x_3} \\ \frac{\partial u_2}{\partial x_1} & \frac{\partial u_2}{\partial x_2} & \frac{\partial u_2}{\partial x_3} \\ \frac{\partial u_2}{\partial x_1} & \frac{\partial u_2}{\partial x_2} & \frac{\partial u_2}{\partial x_3} \end{pmatrix} \quad (53)$$

$$L = -a\Delta - b\nabla\nabla\cdot + cI \quad (54)$$

$$= \begin{pmatrix} -a\Delta - b\frac{\partial^2}{\partial x_2 x_1} & -b\frac{\partial^2}{\partial x_1 x_2} & -b\frac{\partial^2}{\partial x_1 x_3} \\ -b\frac{\partial^2}{\partial x_2 x_1} & -a\Delta - b\frac{\partial^2}{\partial x_2^2} + c & -b\frac{\partial^2}{\partial x_2 x_3} \\ -b\frac{\partial^2}{\partial x_3 x_1} & -b\frac{\partial^2}{\partial x_3 x_2} + c & -a\Delta - b\frac{\partial^2}{\partial x_3^2} + c \end{pmatrix}$$

2.3 Small deformation solution

The large deformation computer algorithms can be related to the small deformation approach described in the '628 application, by choosing v=u, so that T=δ small, then approximate $I - \nabla u(\cdot, \sigma) \approx I$ for $\sigma \in [0, \delta)$, then $\hat{u}(x, \delta) = v(x)\delta$ and defining $u(x) \doteq u(x, \delta)$, so that Eqn. 55 reduces to the small deformation problems described in the '628 application:

$$\hat{u}(x) = arg \min_{v_n, k=1,\ldots} \int_\Omega \|Lu(x)\|^2 dx dt + D(u). \quad (55)$$

3. Composing Large Deformation Transformations Unifying Landmark and Image Matching The approach for generating a hierarchical transformation combining information is to compose the large deformation transformations which are diffeomorphisms and can therefore be composed, $h = h_n \circ \ldots h_2 \circ h_1$. Various combinations of transformations may be chosen, including the affine motions, rigid motions generated from subgroups of the generalized linear group, large deformation landmark transformations which are diffeomorphisms, or the high dimensional large deformation image matching transformation. During these, the dimension of the transformations of the vector fields are being increased. Since these are all diffeomorphisms, they can be composed.

4. Fast Method for Landmark Deformations Given Small Numbers of Landmarks For small numbers of landmarks, we re-parameterize the problem using the Lagrangian frame, discretizing the optimization over space time $\Omega \times T$, into N functions of time T. This reduces the complexity by order of magnitude given by the imaging lattice $[\Omega]$.

For this, define the Lagrangian positions of the N-landmarks $x_i$, $i = 1, \ldots, N$ as they flow through time $\phi_i(\cdot)$, $i = 1, \ldots, N$, with the associated 3N-vector $$\Phi(t) = \underbrace{\begin{pmatrix} \phi(X_1, t) \\ \phi(X_2, t) \\ \vdots \\ \phi(X_N, t) \end{pmatrix}}_{3N \times 1} \quad (56)$$

The particle flows $\Phi(t)$ are defined by the velocities $v(\cdot)$ according to the fundamental O.D.E.

$$\frac{d\phi(t,x)}{dt} = v(\phi(t,x), t). \quad (57)$$

It is helpful to define the 3N×3N covariance matrix $K(\Phi(t))$:

$$K(\Phi(t)) \doteq \underbrace{\begin{pmatrix} K(\Phi(t,x_1), \phi(t,x_1)) & K(\Phi(t,x_1), \phi(t,x_2)) & \cdots & K(\Phi(t,x_1), \phi(t,x_N)) \\ K(\Phi(t,x_2), \phi(t,x_1)) & K(\Phi(t,x_2), \phi(t,x_2)) & \cdots & K(\Phi(t,x_2), \phi(t,x_N)) \\ \vdots & \vdots & \vdots & \vdots \\ K(\Phi(t,x_N), \phi(t,x_1)) & K(\Phi(t,x_N), \phi(t,x_2)) & \cdots & K(\Phi(t,x_N), \phi(t,x_N)) \end{pmatrix}}_{3N \times 3N} \quad (58)$$

The inverse $K(\Phi(t))^{-1}$ is an N×N matrix with 3×3 block entries $(K(\Phi(t))^{-1})_{ij}$, $i, j=1, \ldots, N$.

For the landmark matching problem, we are given N landmarks identified in the two anatomies target $\{x_i, y_i, i=1, 2, \ldots, N\}$, identified with varying degrees of accuracy $\{\Sigma_i, i=1, \ldots N\}$, the $\Sigma_i$, 3×3 covariance matrices.

The squared error distance between the target and template imagery defined in the Lagrangian trajectories of the landmarks becomes $$D_1(\Phi(T)) \doteq \sum_{i=1}^{N} (y_i - \phi(T, x_i))\sum_{1}^{-1} (y_i - \phi(T, x_i)). \quad (59)$$

Then a preferable diffeomorphism is the minimizer of Eqns. 40, 41 with $D_1(\Phi(T))$ the landmark distance:

$$\hat{v}(\cdot) = \arg\min_{v} \int_0^T \int_\Omega \|Lv(x, t)\|^2 dx dt + D_1(\Phi(T)), \quad (60)$$

$$\text{where } \dot{\phi} \doteq \frac{d\phi(t, x)}{dt} = v(\phi(t, x), t) \quad (61)$$

A fast method for small numbers of Landmark matching points exploits the fact that when there are far fewer landmarks N than points in the image $x \in \Omega$, there is the following equivalent optimization problem in the N-Lagrangian velocity fields $\phi(x_i, \cdot)$, $I=1, \ldots, N$ which is more computationally efficient than the optimization of the Eulerian velocity $v(x_i, \cdot), x \in \Omega, (|\Omega| \gg N)$. Then, the equivalent optimization problem becomes $$\hat{v}(x, t) = \sum_{i=1}^{N} K(\phi(t, x_i), x) \sum_{j=1}^{N} (K(\phi(t))^{-1})_{ij} \dot{\phi}(x_j, t) \quad (62)$$

where $$\phi(x_i, \cdot)$$
$$i = 1, \ldots N \equiv$$
$$\arg\min_{\phi(x_i, \cdot) \atop i=1,\ldots N} \int_0^T \sum_{ij} \dot{\phi}(x_i, t)(K(\Phi(t))^{-1})_{ij} \dot{\phi}(x_j, t) + D_1(\Phi(T)), \quad (63)$$

and $$\hat{\phi}(x, T) = \int_0^T \hat{v}(\phi(x, t)\sigma) d\sigma + x. \quad (64)$$

This reduces to a finite dimensional problem by defining the flows on the finite grid of times, assuming step-size $\delta$ with Lagrangian velocities piecewise constant within the quantized time intervals:

$$\dot{\phi}(x_i, t) = \frac{\phi(x_i, k\delta) - \phi(x_i, (k-1)\delta)}{\delta}, \quad (65)$$
$$t \in [(k-1)\delta, k\delta), k = 1, \ldots T/\delta.$$

Then the finite dimensional minimization problem becomes $$\hat{\phi}(x_i, k) = \arg\min_{\substack{\Phi(x_i, k) \\ i=1,\ldots,N \\ k=1,\ldots,T/\delta}} \frac{1}{\delta_2} \sum_{k=1}^{T/\delta} \sum_{ij=1}^{N} (\phi(x_i, k) - \phi(x_i, k-1))^T$$

$$\left(\int_{(k-1)}^{k\delta} (K(\Phi(t))^{-1})_{ij} dt\right)(\phi(x_j, k) - \phi(x_j, k)) +$$

$$\sum_{i=1}^{N} (\phi(x_1, T/\delta) - y_i)^1 \sum_{1}^{-1} (\phi(x_i, T/\delta) - y_i)$$

subject to: $\phi(x_i, 0) = x_i$, $i=1, \ldots, N$

The Method:

In order to properly register the template image with the target image when a small number of landmarks have been identified, the method of the present embodiment utilizes the Largrangian positions. The method for registering images consistent with the present invention includes the following steps:

STEP 0: Define a set of landmarks in the template which can be easily identified in the target $\{x_i: x_i \in \Omega, i=1,2, \ldots, N\}$, with varying degrees of accuracy in the target as $\{y_i, i=1, \ldots, N\}$ with associated error covariance $\{\Sigma_i, i=1, \ldots, N\}$, and initialize for $n=0$, $\phi^{(n)}(x_i, \cdot) = x_i$.

STEP 1: Calculate velocity and deformation fields:

$$\dot{\phi}^{(n)}(x_i, t) = \frac{\phi^{(n)}(x_i, k\delta) - \phi^{(n)}(x_i, (k-1)\delta)}{\delta}, \quad (66)$$
$$t \in [(k-1)\delta, k\delta), k = 1, \ldots T/\delta.$$

STEP 2: Solve via estimation of the Lagrangian positions $\phi(k), k=1, \ldots, K$.

For each $\phi(x_i, k)$, $$\phi^{(n+1)}(x_i, k) = \phi^{(n)}(x_i, k) - \Delta\left(\frac{\partial P(\Phi)}{\partial \phi(x_i, k)}\bigg|\Phi^{(n)} + \frac{\partial D(\Phi)^{(n)}(T))}{\partial \phi(x_i, k)}\right) \quad (67)$$

where (1) $\frac{\partial D(\Phi)(T))}{\partial \phi(x_i, k)} = \delta[k - T/\delta] - \left(-Zy; \sum_{i}^{-1} (\phi(x_i, T) - y_i)\right)$ (2) $\frac{\partial P^{(n)}(\Phi)}{\partial \phi(x_i, k)} =$ $$\sum_{j=1}^{N} \left[-2(\phi(x_j, k+1) - \phi(x_j, k)) \int_{(k)\delta}^{(k+1)\delta} (K(\phi(t))^{-1})_{ij} dt + \right.$$

$$2(\Phi(x_j, k) - \Phi(x_j, -k)) \int_{(k-1)}^{k\delta} (K(\Phi(t))^{-1})_{ij} dt +$$

$$(K(\Phi(t))^{-1})_{ij} \left(\frac{\partial K(\Phi)(t))^{-1}}{\partial \phi(x_i, k)}\right)_{ij} (K(\Phi(t))^{-1})_{ij}$$

$$dt(\phi(x_j, x_j, k+1) - \phi(x_j, k)) \int_{(k)\delta}^{(k+1)\delta}$$

STEP 3: Set $n \leftarrow n+1$, and return to Step 1.

STEP 4: After stopping, then compute the optimal velocity field using equation 62 and transform using equation 64.

5. Fast Greedy Implementation of Large Deformation Image Matching

For the image matching, discretize space-time $\Omega \times T$ into a sequence of indexed in time optimizations, solving for the locally optimal at each time transformation and then forward integrate the solution. This reduces the dimension of the optimization and allows for the use of Fourier transforms.

The transformation $h(\cdot, t):\Omega \to \Omega$ where $h(x, t)=x-u(x, t)$, and the transformation and velocity fields are related via the O.D.E.

$$v(x, t) = \frac{\partial u(x, t)}{\partial t} + \nabla u(x, t)v(x, t), t \in [0, T]$$

Preferably the deformation fields are generated from the velocity fields assumed to be piecewise constant over quantized time increments, $$(x, i) = v(x, t_{i+1})v(x, t),$$
$$t \in [i\delta, (i+1)\delta), i = 1, \ldots I = \frac{T}{\delta},$$

the quantized time increment. Then the sequence of deformations $u(x,t_i), i=1, \ldots I$ is given by $$u(x, t_{i+1}) = u(x, t_i)\left(\int_{t_i}^{t_{i+1}} (I - \nabla u(x, \sigma))d\sigma\right), i = , \ldots, I. \quad (68)$$

For $\delta$ small, approximate $\nabla u(x,\sigma) \approx \nabla u(x,t_i), \sigma \in [t_i, t_{i+1}]$, then the global optimization is solved via a sequence of locally optimal solutions according to for $t_i$, $I=1, \ldots, I$, $$\hat{u}(x, t_{i+1}) = \hat{u}(x, t_i) + \delta(I - \nabla^T \hat{u}(x, t_i))\hat{v}(x, t_i) \quad (69)$$

where $$\hat{v}(x, t_{i+1}) =$$
$$\arg \min_{\{v_k \cdot v(\cdot, t_{i+1}) = \Sigma_k v k \phi k(\cdot, T_{i+1})\}} \left( H(v(t_{i+1}) \doteq \int_\Omega \|Lv(x, t_{i+1})\|^2 dx + D(u(\cdot, t_{i+1}))\right).$$

The sequence of locally optimal velocity fields $\hat{v}(x,t_i)$, $i=1, \ldots I$ satisfy the O.D.E.

$$L^\dagger L \hat{v}(x,t_{i+1}))\text{where } \hat{u}(x,t_{i+1}) = \hat{u}(x,t_i) + \delta(I - \nabla \hat{u}(x,t_i))\hat{v}(x,t_i). \quad (70)$$

Examples of boundary conditions include $v(x,t)=0$, $x \in \partial\Omega$ and $t \in [0,T]$ and $L$ the linear differential operator $L=-a\nabla^2 -b\nabla\cdot\nabla+cI$. The body force $b(x-u(x,t))$ is given by the variation of the distance $D(u)$ with respect to the field at time $t$. The PDE is solved numerically (G. E. Christensen, R. D. Rabbitt, and M. I. Miller, "Deformable templates using large deformation kinematics," *IEEE Transactions on Image Processing*, 5(10):1435–1447, Oct. 1996 for details (hereinafter referred to as Christensen).

To solve for fields $u(\cdot, t_i)$ at each $t_i$, expand the velocity fields $\Sigma^k V_k(t_i)\phi_k(\cdot)$. $v(\cdot,t_i)=\Sigma^k Vk(t_i)\phi k(\cdot)$. To make the inner-products required by the iterative algorithms into shift invariant convolution, force the differential and difference operators $L$ to be defined on a periodic version of the unit cube $\Omega \doteq [0,1]^3$ and the discrete lattice cube $\{0,1,\ldots, N-1\}^3$. f·g denotes the inner-product $f \cdot g = \Sigma^3_{i=1} f_i g_i$ for $f, g \in R^3$. The operators are cyclo-stationary in space, implying their eignen functions are of the form of complex exponentials on these cubes:

$$\phi_k^d(x) = \begin{bmatrix} c_{1k}^{(d)} \\ c_{2k}^{(d)} \\ c_{3k}^{(d)} \end{bmatrix} e^{jw_k \cdot x}, d = 1, 2, 3$$

with $x = (x_1, x_2, x_3) \in [0, 1]^3$, $w_k = (\omega_{k1}, \omega_{k2}, \omega_{k3}), \omega_{k_i} = 2\pi k_i i = 1, 2, 3$, and the Fourier basis for periodic functions on $[0,1]^3$ takes the form $e^{j<\omega_k, x>}$, $<\omega_k, x> = \omega_{k1}x_1 + \omega_{k2}x_2 + \omega_{k3}x_3$. On the discrete $N^3$=periodic lattice, $$\omega_k = \left(\frac{2\pi k_1}{N}, \frac{2\pi k_2}{N}, \frac{2\pi k_3}{N}\right), x \in \{0, 1, \ldots, N-1\}^3.$$

This supports an efficient implementation of the above algorithm exploiting the Fast Fourier Transform (FFT).

Suppressing the d subscript on $v_{k,d}$ and the summation from d=1 to 3 for the rest of this section simplifies notation. The complex coefficients $v_k(t_i) = a_k(t_i) + b_k(t_i)$ have complex-conjugate symmetry because they are computed by taking the FFT of a real valued function as seen later in this section. In addition, the eigen functions have complex-conjugate symmetry due to the $2\pi$ periodicity of the complex exponentials. Using these two facts, it can be shown that the vector field $$v(x, t_i) = \sum_{k=0}^{N-1} v_k(t_i)\phi_k(x) \quad (71)$$
$$= 2\sum_{k=0}^{N/2-1} a_k(t_i)\text{Re}\{\phi_k(x)\} - b_k(t_i)\text{Im}\{\phi_k(x)\}$$

is $R^3$valued even though both $v_k(t_i)$ and $\phi_k(x)$ are complex valued. The minimization problem is solved by computing for each $v_k = a_k + b_k$, $$g_k^{(n+1)} \doteq g_k^{(n)} - \Delta \frac{\partial H(v^{(n)}(x, t_i))}{\partial g_k} \quad (72)$$
$$= g_k^{(n)} - \Delta \left(\lambda_k^2 g_k^{(n)} + \frac{\partial D(u^{(n)}(x, t_i))}{\partial g_k}\right)$$

where $$\frac{\partial D(u^{(n)}(x, t_i))}{\partial g_k} = -2\gamma \int_\Omega (I_0(x - u^{(n)}(x, t_i)) - I_1(x))\nabla_u I_0(x - u^{(n)}(x, t_i)) \cdot \frac{\partial u^{(n)}(x, t_i)}{\partial g_k} dx$$

and $g_k \in \{a_k, b_k\}$. Combining Eqs. 70 and 71 and taking derivatives gives $$\frac{\partial u^{(n)}(x, t_i)}{\partial a_k} = 2\delta(I - \nabla u(x, t_i))\text{Re}\{\phi_k(x)\} \quad (73)$$
$$\frac{\partial u^{(n)}(x, t_i)}{\partial b_k} = -2\delta(I - \nabla u(x, t_i))\text{Im}\{\phi_k(x)\}.$$

Consider the computation of the following terms of the algorithm from equations 73, Term 1: $\int_\Omega (I_0(x - u(x, t_i)) - I_1(x))\nabla I_0|_{x - u(x,t_i)} \cdot (I - \nabla u(x, t_i))\phi_k(x)dx,$ -continued Term 2: $v(x, t_i) = \sum_{k=0}^{N-1}\sum_{d=1}^{3} v_k, d(t_i)\phi_k^{(d)}(x)$ Computation of Term 1: The first term given by $$\theta(t_i) = \int_\Omega \sum_{d=1}^{3} (I_0(x-u)(x_i, t_i)) - I_1(x))\nabla I_0|_{x-u(x,t_i)} \cdot (I - \nabla_u(x, t_i))\phi_k^{(d)}(x)dx,$$

can be written as $$\theta(t_i) =$$

$$\int_\Omega \sum_{d=1}^{3} (I_0(x-u)(x, t_i)) - I_1(x))\nabla I_0|_{x-u(x,t_i)} \cdot (I - \nabla_u(x, t_i)) \begin{bmatrix} c_{1k}^{(d)} \\ c_{2k}^{(d)} \\ c_{3k}^{(d)} \end{bmatrix} e^{j\omega k \cdot x} dx$$

This equation can be computed efficiently using three 3D FFTs of the form $$\theta_s, (t_i) = \int_\Omega f_s(x, t_i) e^{j\omega_k \cdot x} dx \text{ where}$$

$$f_3(x, t_i) = \left[\sum_{d=1}^{3}(I_0(x-u(x, t_i)) - I_1(x))\nabla I_0|_{x-u(x,t_i)} \cdot (I - \nabla u(x, t_i))c_{3k}^{(d)}\right]$$

and s=1,2,3. These FFTs are used to evaluate Eq. 72 by noticing:

$$\left[\frac{\partial d(u^{(n)}(x, t_i))}{\partial g_k}\right] = -4\gamma \text{Re}\{\theta, (t_i)\} \text{ and}$$

$$\left[\frac{\partial d(u^{(n)}(x, t_i))}{\partial b_k}\right]_3 = 4\gamma \text{Im}\{\theta_s, (t_i)\}.$$

Computation of Term 2:
The second term given by $$v(x, t_i) = \sum_{k=0}^{N}\sum_{d=1}^{3} v_{k,d}(t_i)\phi_k^{(d)}(x) = \sum_{k=0}^{N-1}\sum_{d=1}^{3} v_{k,d}(t_i)\begin{bmatrix} c_{1k}^{(d)} \\ c_{2k}^{(d)} \\ c_{3k}^{(d)} \end{bmatrix} e^{j\omega_k \cdot x} \quad (74)$$

can be computed efficiently using three 3D FFTs. Specifically the 3D FFTs are $$v_s(x, t_i) = \sum_{k=0}^{N-1} h_i(k, t_i) e^{j\omega_k \cdot x} \quad (75)$$

for $s = 1, 2, 3$ and $h_i(k, t_i) = \sum_{d=1}^{3} v_{k,d}(t_i)c_{3k}^{(d)}$.

Using the FFT to compute the terms in the method provides a substantial decrease in computation time over brute force computation. For example, suppose that one wanted to process $256^3$ voxel data volumes. The number of iterations is the same in both the FFT and brute force computation methods and therefore does not contribute to our present calculation. For each 3D summation in the method, the brute force computation requires on the order $N^6$ computations while the FFT requires on the order $3N^3\log_2(N)$ computations. For $N^3=256^3$ voxel data volumes this provides approximately a $7 \times 10^5$ speed up for the FFT algorithm compared to brute force calculation.

6. Rapid Convergence Algorithm for Large Deformation Volume Transformation

Faster converging algorithms than gradient descent exist such as the conjugate gradient method for which the basis coefficients $v_k$ are updated with optimal step sizes.

The identical approach using FFTs follows as in the '628 application. Identical speed-ups can be accomplished; see the '628 application.

6.1 An extension to general distance functions

Thus far only the Gaussian distance function has been described measuring the disparity between imagery has been described $|I_0(x-u(x))-_1(x)|^2 d$. More general distance functions can be written as $\int D(I_0(x-u(x))), I_1(x))dx$. A wide variety of distance functions are useful for the present invention such as the correlation distance, or the Kullback Liebler distance can be written in this form.

6.2 Computational Complexity

The computational complexity of the methods herein described is reduced compared to direct computation of the inner-products. Assuming that the image is discretized on a lattice of size $N^3$ each of the inner-products in the algorithm, if computed directly, would have a computational complexity of $O((N^3)^2)$. As the inner-products are most computationally intensive, the overall complexity of the method is $O((N^3)^2)$. Now in contrast, each of the FFTs proposed have a computational complexity of $O(N^3\log_2 N^3)$, and hence the total complexity of the proposed algorithm is $O(N^3\log_2 N^3)$. The speed up is given by the ratio $N^6/(N^3\log_2 N^3)=N^3/(3 \log_2 N)$. Thus the speed up is 64 times for $16 \times 16 \times 16$ volume and greater than $3.2 \times 10^4$ speed up for a $256 \times 256 \times 256$ volume.

A further factor of two savings in computation time can be gained by exploiting the fact that all of the FFTs are real. Hence all of the FFTs can be computed with corresponding complex FFTs of half the number of points (see Oppenheim).

6.3 Boundary Conditions of the Operator

Additional methods similar to the one just described can be synthesized by changing the boundary conditions of the operator. In the previous section, the minimization problem was formulated with cyclic boundary conditions. Alternatively, we could use the mixed Dirichlet and Neumann boundary conditions corresponding to $\partial u_j/\partial x_i(x|x_i=k)=u_i(x|x_j=k)=0$ for $i,j=1,2,3$; $i \neq j$; $k=0,1$ where the notation $(x|x_i=k)$ means $x \in \Omega$ such that $x_i=k$. In this case the eigen functions would be of the form $$\varphi_k^{(d)} = \begin{bmatrix} c_{1k}^{(d)}\cos\omega_{k1}x_1\sin\omega_{k2}x_2\sin\omega_{k3}x_2 \\ c_{2k}^{(d)}\cos\omega_{k1}x_1\sin\omega_{k2}x_2\sin\omega_{k3}x_2 \\ c_{3k}^{(d)}\cos\omega_{k1}x_1\sin\omega_{k2}x_2\sin\omega_{k3}x_2 \end{bmatrix} \text{ for } d = 1, 2, 3$$

The implementation presented in Section 5 is modified for different boundary conditions by modifying the butterflys of the FFT from complex exponentials to appropriate sines and cosines.

7. Apparatus for Image Registration

FIG. 2 shows an apparatus to carry out an embodiment of this invention. A medial imaging scanner 214 obtains image 100 and 120 and stores them in computer memory 206 which is connected to computer control processing unit (CPU) 204. One of the ordinary skill in the art will recognize that a parallel computer platform having multiple CPUs is also a suitable hardware platform for the present invention, including, but not limited to, massively parallel machines and workstations with multiple processors. Computer memory 206 can be directly connected to CPU 204, or this memory can be remotely connected through a communications network.

The method described herein use information either provided by an operator, stored as defaults, or determined automatically about the various substructures of the template and the target, and varying degrees of knowledge about these substructures derived from anatomical imagery, acquired from modalities like CT, MRI, functional MRI, PET, ultrasound, SPECT, MEG, EEG, or cryosection. For example, an operator can guide cursor 210 using pointing device 208 to select in image 100.

The foregoing description of the preferred embodiments of the present invention has been provided for the purpose of illustration and description. It is not intended to be exhaustive or to limit the invention to the precise forms disclosed. Obviously many modifications, variations and simple derivations will be apparent to practitioners skilled in the art. The embodiments were chosen and described in order to best explain the principles of the invention and its practical application, thereby enabling others skilled in the art to understand the invention for various embodiments and with various modifications are suited to the particular use contemplated. It is intended that the scope of the invention be defined by the following claims and their equivalents.

What is claimed is:

1. A method for registering a template image with a target image, the template image containing a plurality of points, and the target image containing a plurality of points, comprising the steps of:

defining a manifold landmark point in said template image;

identifying a point in said target image corresponding to said defined a manifold landmark point;

computing a large deformation transform that is one-to-one and onto for any point selected in the template and target image, using a manifold landmark transformation operator and a manifold landmark transformation boundary value relating said manifold landmark point in said template image to said corresponding point in said target image; and registering said template image with said target image using said large deformation transform.

2. An apparatus for registering a template image with a target image, the template image containing a plurality of points, and the target image containing a plurality of points, comprising:

means for defining a manifold landmark point in said template image;

means for identifying a point in said target image corresponding to said defined a manifold landmark point;

means for computing a large deformation transform that is one-to-one and onto for any point selected in the template and target image using a manifold landmark transformation operator and a manifold landmark transformation boundary value relating said manifold landmark point in said template image to said corresponding point in said target image; and means for registering said template image with said target image using said large deformation transform.

3. A method for registering a template image with a target image, comprising the steps of:

defining a distance measure between said target and said template image;

computing a large deformation transform that is one-to-one and onto for any point selected in the template and target image, using an image transformation operator and an image transformation boundary value relating said template image to said target image; and registering said template image with said target image using said large deformation transform.

4. An apparatus for registering a template image with a target image, comprising:

means for defining a distance measure between said target image and said template image;

means for computing a large deformation transform that is one-to-one and onto for any point selected in the template and target image using an image transformation operator and an image transformation boundary value relating said template image to said target image; and means for registering said template image with said target image using said large deformation transform.

5. A method for registering a template image with a target image, wherein the template image contains a plurality of points and the target image contains a plurality of points, comprising the steps of:

defining a manifold landmark point in said template image;

identifying a point in said target image corresponding to said defined manifold landmark point;

computing a first large deformation transform using a manifold landmark transformation operator and a manifold landmark transformation boundary value relating said manifold landmark point in said template image to said corresponding point in said target image;

defining a distance measure between said target and said template image;

computing a second large deformation transform using an image transformation, operator and an image transformation boundary value relating said template image to said target image;

fusing said first and second large deformation transforms; and registering said template image with said target image using said fused large deformation transforms.

6. An apparatus for registering a template image with a target image, wherein the template image contains a plurality of points and the target image contains a plurality of points, comprising:

means for defining a manifold landmark point in said template image;

means for identifying a point in said target image corresponding to said defined manifold landmark point;

means for computing a first large deformation transform using a manifold landmark transformation operator and a manifold landmark transformation boundary value relating said manifold landmark point in said template image to said corresponding point in said target image;

means for defining a distance measure between said target and said template image;

means for computing a second large deformation transform using an image transformation operator and an image transformation boundary value relating said template image to said target image;

means for fusing said first and second large deformation transforms; and means for registering said template image with said target image using said fused large deformation transforms.

7. The method of claim 1, wherein the step of computing said large deformation transform further includes the substep of computing a diffeomorphic, non-affine transform.

8. The method of claim 1, wherein the step of computing said large deformation transform further includes the substep of computing a diffeomorphic, higher order transform.

9. The method of claim 3, wherein the step of computing said large deformation transform further includes the substep of computing a diffeomorphic, non-affine transform.

10. The method of claim 3, wherein the step of computing said large deformation transform further includes the substep of computing a diffeomorphic, higher order transform.

11. The method of claim 5, wherein the step of computing said large deformation transform further includes the substep of computing a diffeomorphic, non-affine transform.

12. The method of claim 5, wherein the step of computing said large deformation transform further includes the substep of computing a diffeomorphic, higher order transform.

13. The method of either claim 1 or 5, wherein said step of defining manifold landmark points in said template image includes the substep of:

defining manifold landmark points of dimension greater than zero in said template image.

14. The method of either claim 1 or 5, wherein said step of defining manifold landmark points in said template image includes the substep of:

defining individual points in said template image.

15. The method of either claim 1 or 5, wherein said step of defining manifold landmark points in said template image includes the substep of:

defining points of a curve in said template image.

16. The method of either claim 1 or 5, wherein said step of defining manifold landmark points in said template image includes the substep of:

defining points of a surface in said template image.

17. The method of either claim 1 or 5, wherein said step of defining manifold landmark points in said template image includes the substep of:

defining points of a volume in said template image.

18. The method of either claim 1, 3 or 5, wherein said step of computing large deformation transform includes the substep of:

using a linear differentiable operator.

19. The method of either claim 1, 3 or 5, wherein said step of computing said large deformation transform includes the substep of:

using periodic boundary values.

20. The method of either claim 1, 3 or 5, wherein said step of computing said large deformation transform includes the substep of:

using infinite boundary values.

21. The method of either claim 1, 3 or 5, wherein said step of computing said large deformation transform includes the substep of:

using mixed Dirichlet and Neumann boundary values.

22. The method of either claim 1, 3 or 5, wherein said step of computing said large deformation transform includes the substep of:

using Neumann boundary values.

23. The method of either claim 1, 3 or 5, wherein said step of computing said large deformation transform includes the substep of:

using Dirichlet boundary values.

24. The method of either claim 1, 3 or 5, wherein said step of computing said large deformation transform includes the substep of:

accessing stored pre-computed transform values.

25. The method of either claim 1, 3 or 5, wherein said step of computing said large deformation transform includes the substep of:

using a fast Fourier transform.

26. The apparatus of claim 2, wherein said large deformation transform is a diffeomorphic, non affine transform.

27. The apparatus of claim 2, wherein said large deformation transform is a diffeomorphic, higher order transform.

28. The apparatus of claim 4, wherein said large deformation transform is a diffeomorphic, non affine transform.

29. The apparatus of claim 4, wherein said large deformation transform is a diffeomorphic, higher order transform.

30. The apparatus of claim 6, wherein said large deformation transform is a diffeomorphic, non affine transform.

31. The apparatus of claim 6, wherein said large deformation transform is a diffeomorphic, higher order transform.

32. The apparatus of either claim 2 or 6, wherein said means for defining manifold landmark points in said template image comprises:

means for defining manifold landmark points of dimension greater than zero in said template image.

33. The apparatus of either claim 2 or 6, wherein said means for defining manifold landmark points in said template image comprises:

means for defining individual points in said template image.

34. The apparatus of either claim 2 or 6, wherein said means for defining manifold landmark points in said template image comprises:

means for defining points of a curve in said template image.

35. The apparatus of either claim 2 or 6, wherein said means for defining manifold landmark points in said template image comprises:

means for defining points of a surface in said template image.

36. The apparatus of either claim 2 or 6, wherein said means for defining manifold landmark points in said template image comprises:

means for defining points of a volume in said template image.

37. The apparatus of either claim 2, 4 or 6, wherein said means for computing said large deformation transform comprises:

means for using a linear differentiable operator.

38. The apparatus of either claim 2, 4 or 6, wherein said means for computing said large deformation transform comprises:

means for using periodic boundary values.

39. The apparatus of either claim 2, 4 or 6, wherein said means for computing said large deformation transform comprises:

means for using infinite boundary values.

40. The apparatus of either claim 2, 4 or 6, wherein said means for computing said large deformation transform comprises:

means for using mixed Dirichlet and Neumann boundary values.

41. The apparatus of either claim 2, 4 or 6, wherein said means for computing said large deformation transform comprises:

means for using Neumann boundary values.

42. The apparatus of either claim 2, 4 or 6, wherein said means for computing said large deformation transform comprises:

means for using Dirichlet boundary values.

43. The apparatus of either claim 2, 4 or 6, wherein said means for computing said large deformation transform comprises:

means for accessing stored pre-computed transform values.

44. The apparatus of either claim 2, 4 or 6, wherein said means for computing said large deformation transform comprises:

using a fast Fourier transform.

45. An apparatus for registering a template image with a target image, the template image containing a plurality of points, and the target image containing a plurality of points, comprising:

a pointing device for defining a manifold landmark point in said template image and for identifying a point in said target image corresponding to said defined manifold landmark point a first data processing unit for computing a large deformation transform that is one-to-one and onto for any point selected in the template and target image, using a manifold landmark transformation operator and manifold landmark transformation boundary values relating said manifold landmark points in said template image to said corresponding points in said target image; and a second data processing unit for registering said template image with said target image using said large deformation transform.

46. An apparatus for registering a template image with a target image comprising:

a distance quantifier for defining a distance between said target image and said template image;

a first data processing unit for computing a large deformation transform that is one-to-one and onto for any point selected in the template and target image using an image transformation operator and an image transformation boundary value relating said template image to said target image; and a second data processing unit for registering said template image with said target image using said large deformation transform.

47. An apparatus for registering a template image with a target image, wherein the template image contains a plurality of points and the target image contains a plurality of points, comprising:

a pointing device for defining a manifold landmark point in said template image and for identifying a point in said target image corresponding to said defined manifold landmark point;

a first data processing unit for computing a first large deformation transform using a manifold landmark transformation operator and a manifold landmark transformation boundary value relating said manifold landmark point in said template image to said corresponding point in said target image;

a distance quantifier for defining a distance between said target image and said template image;

a second data processing unit for computing a second large deformation transform using an image transformation operator and an image transformation boundary value relating said template image to said target image; and a third data processing unit for fusing said first and second large deformation transforms; and a fourth data processing unit for registering said template image with said target image using said fused large deformation transforms.

48. A method for registering a template image with a target image, comprising the steps of:

defining a distance measure between said target and said template image;

computing a diffeomorphic transform using said distance measure, an image transformation operator, and an image transformation boundary value relating said template image to said target image; and registering said template image with said target image using said diffeomorphic transform.

49. An apparatus for registering a template image with a target image, comprising:

means for defining a distance measure between said target image and said template image;

means for computing a diffeomorphic transform using an image transformation operator, said distance measure, and an image transformation boundary value relating said template image to said target image; and means for registering said template image with said target image using said diffeomorphic transform.

50. A method for registering a template image with a target image, wherein the template image contains a plurality of points and the target image contains a plurality of points, comprising the steps of:

defining a manifold landmark point in said template image;

identifying a point in said target image corresponding to said defined manifold landmark point;

computing a first diffeomorphic transform using a manifold landmark transformation operator and a manifold landmark transformation boundary value relating said manifold landmark point in said template image to said corresponding point in said target image;

defining a distance measure between said target and said template image;

computing a second diffeomorphic transform using an image transformation operator and an image transformation boundary value relating said template image to said target image;

fusing said first and second diffeomorphic transforms; and registering said template image with said target image using said fused diffeomorphic transforms.

51. An apparatus for registering a template image with a target image, wherein the template image contains a plurality of points and the target image contains a plurality of points, comprising:

means for defining a manifold landmark point in said template image;

means for identifying a point in said target image corresponding to said defined manifold landmark point;

means for computing a first diffeomorphic transform using a manifold landmark transformation operator and a manifold landmark transformation boundary value relating said manifold landmark point in said template image to said corresponding point in said target image;

means for defining a distance measure between said target and said template image;

means for computing a second diffeomorphic transform using an image transformation operator and an image transformation boundary value relating said template image to said target image;

means for fusing said first and second diffeomorphic transforms; and means for registering said template image with said target image using said fused diffeomorphic transforms.

* * * * *

UNITED STATES PATENT AND TRADEMARK OFFICE
CERTIFICATE OF CORRECTION

PATENT NO. : 6,226,418 B1
DATED : May 1, 2001
INVENTOR(S) : Miller et al.

It is certified that error appears in the above-identified patent and that said Letters Patent is hereby corrected as shown below:

Column 27, claim 1,
Line 34, delete "a" after defined.

Column 27, claim 2,
Line 52, delete "a" after defined.

Column 28, claim 5,
Line 34, delete "," after transformation.

Signed and Sealed this

Twenty-second Day of January, 2002

Attest:

JAMES E. ROGAN
Attesting Officer  Director of the United States Patent and Trademark Office